US011168500B2

(12) United States Patent
Urano et al.

(10) Patent No.: US 11,168,500 B2
(45) Date of Patent: Nov. 9, 2021

(54) DRIVE UNIT

(71) Applicants: MITSUBA Corporation, Gunma (JP); Honda Motor Co., Ltd., Tokyo (JP)

(72) Inventors: Yoshitaka Urano, Gunma (JP); Joji Goto, Saitama (JP); Kenichiro Kagawa, Saitama (JP); Takashi Fukahori, Saitama (JP); Hiroshi Shingu, Saitama (JP)

(73) Assignees: MITSUBA Corporation, Gunma (JP); Honda Motor Co., Ltd., Tokyo (JP)

( * ) Notice: Subject to any disclaimer, the term of this patent is extended or adjusted under 35 U.S.C. 154(b) by 123 days.

(21) Appl. No.: 16/663,380

(22) Filed: Oct. 25, 2019

(65) Prior Publication Data
US 2020/0131822 A1    Apr. 30, 2020

(30) Foreign Application Priority Data

Oct. 26, 2018 (JP) .............................. JP2018-201486

(51) Int. Cl.
*E05F 11/00* (2006.01)
*E05D 15/06* (2006.01)
(Continued)

(52) U.S. Cl.
CPC .......... *E05D 15/0626* (2013.01); *B60J 5/047* (2013.01); *E05F 1/1008* (2013.01); *E05F 1/16* (2013.01); *E05F 7/08* (2013.01)

(58) Field of Classification Search
CPC ......... E05F 1/16; E05F 1/1008; E05F 15/643; E05D 15/5208; B60J 5/047;
(Continued)

(56) References Cited

U.S. PATENT DOCUMENTS 5,054,162 A * 10/1991 Rogers ................ E05D 13/1276
16/198
5,259,433 A * 11/1993 Cloutier .................. E05D 13/14
160/190
(Continued)

FOREIGN PATENT DOCUMENTS

CN    101235696    8/2008
CN    101781961    7/2010
(Continued)

OTHER PUBLICATIONS

"Office Action of China Counterpart Application", dated Feb. 25, 2021, with English translation thereof, p. 1-p. 15.

*Primary Examiner* — Jerry E Redman
(74) *Attorney, Agent, or Firm* — JCIPRNET

(57) ABSTRACT

A large diameter portion is provided on one side of a closing side drum in an axial direction, a small diameter portion having a diameter gradually decreasing from the large diameter portion to the other side of the closing side drum is provided on the other side of the closing side drum, a partition wall disposed between adjacent small diameter cable grooves in the axial direction of the closing side drum to prevent a closing side cable from slipping out of the small diameter cable grooves is provided in the small diameter portion. Accordingly, the thick partition wall provided in the small diameter portion can reliably prevent the closing side cable from slipping out (derailing) from the small diameter cable grooves even when a winding position of the closing side cable on the closing side drum is changed and transferred from the large diameter portion to the small diameter portion.

3 Claims, 12 Drawing Sheets

(51) Int. Cl.
 *E05F 1/16* (2006.01)
 *E05F 7/08* (2006.01)
 *B60J 5/04* (2006.01)
 *E05F 1/10* (2006.01)

(58) Field of Classification Search
 CPC ......... E05Y 2201/654; E05Y 2201/664; E05Y 2800/26; E05Y 2900/531
 USPC .......................................................... 49/360
 See application file for complete search history.

(56) References Cited

U.S. PATENT DOCUMENTS

| | | | |
|---|---|---|---|
| 8,800,205 B2* | 8/2014 | Yamaguchi | B60J 5/06 49/358 |
| 2005/0051406 A1* | 3/2005 | Hopper | H02G 11/02 191/12.2 R |
| 2005/0082015 A1* | 4/2005 | Altimore | E05D 13/1238 160/133 |
| 2011/0016793 A1 | 1/2011 | Gallois et al. | |
| 2015/0041277 A1* | 2/2015 | Boyes | F16D 27/14 192/80 |
| 2016/0040733 A1* | 2/2016 | Staniewicz | B60K 25/02 701/67 |
| 2017/0002596 A1* | 1/2017 | Laird | E05D 13/1261 |
| 2019/0225456 A1* | 7/2019 | Bonnell | B65H 75/4415 |
| 2020/0131822 A1* | 4/2020 | Urano | B60J 5/047 |
| 2020/0339395 A1* | 10/2020 | Kicher | B66D 1/60 |

FOREIGN PATENT DOCUMENTS

| | | |
|---|---|---|
| CN | 204078034 | 1/2015 |
| JP | H09235943 | 9/1997 |
| JP | 2008068643 | 3/2008 |
| JP | 2008266938 | 11/2008 |
| JP | 6061353 | 1/2017 |

\* cited by examiner

FIG. 4 [B-B cross-section]

[ C-C cross-section ]

[fully open state]

[fully closed state]

DRIVE UNIT

CROSS-REFERENCE TO RELATED APPLICATION

This application claims the priority benefit of Japan Application No. 2018-201486, filed on Oct. 26, 2018. The entirety of the above-mentioned patent application is hereby incorporated by reference herein and made a part of this specification.

BACKGROUND

Technical Field

The disclosure relates to a drive unit that drives an opening and closing body that opens and closes an opening portion.

Description of Related Art

An opening portion that allows occupants to get into or out of a vehicle or to load or unload luggage is provided on a side of a vehicle such as a car and the like. Such an opening portion opens to a relatively large extent and is opened and closed by a sliding door moving along a slide rail provided in the vehicle body. Since the sliding door is heavy, a sliding door opening and closing mechanism that can automatically open and close the sliding door may be mounted in vehicles equipped with sliding doors.

A sliding door opening and closing mechanism has a drive unit. The drive unit includes a pair of cables that pull the sliding door. The drive unit has a drum on which the pair of cables are wound in opposite directions, and the pair of cables are moved respectively by the drum rotating forward or backward. Accordingly, the sliding door is opened or closed.

Japanese Patent Laid-Open Publication No. 2008-266938, for example, discloses such a drive unit. The drive unit described in Japanese Patent Laid-Open Publication No. 2008-266938 has an electric motor and a drum rotated by the electric motor. In addition, ends of an opening side cable and a closing side cable are wound on the drum in opposite directions. Thus, the closing side cable is sent out when the opening side cable is wound up, and the sliding door is moved in an opening direction.

In addition, the drum of the drive unit described in Japanese Patent Laid-Open Publication No. 2008-266938 includes a large diameter portion and a small diameter portion. Thus, a winding speed and a winding torque of the cables are able to vary according to a position of the sliding door. When a cable is wound up on the large diameter portion, for example, a winding torque of the cable decreases while a winding speed thereof increases. Conversely, when the cable is wound up on the small diameter portion, a winding torque of the cable increases while a winding speed thereof slows down.

However, in the drive unit described in the above-mentioned Japanese Patent Laid-Open Publication No. 2008-266938, the spacing between adjacent spiral grooves in the axial direction of the drum is narrow, and when the cable is wound on the spiral grooves, adjacent cables may become close enough to come in contact with each other. Thus, when the position of the drum on which the cable is wound is changed and transitions from the large diameter portion to the small diameter portion during driving of the drive unit, for example, a problem of the cable easily slipping out (derailing) from the spiral grooves on the large diameter side to the spiral grooves on the small diameter side may arise.

SUMMARY

The disclosure provides a drive unit that can reliably prevent a cable from derailing even when one side and the other side of a drum in an axial direction have different diameters.

According to an aspect of the disclosure, a drive unit driving an opening and closing body that opens and closes an opening portion includes a cable pulling the opening and closing body, a drum having a cable groove on which the cable is wound, an electric motor rotating the drum, a large diameter portion provided on one side of the drum in an axial direction, a small diameter portion provided on the other side of the drum in the axial direction having a diameter gradually decreasing from the large diameter portion to the other side of the drum in the axial direction, and a slip preventing wall provided in the small diameter portion, disposed between adjacent cable grooves in the axial direction of the drum, and preventing the cable from slipping out of the cable grooves.

According to another aspect of the disclosure, a height dimension of the slip preventing wall in a radial direction of the drum may be greater than a diameter dimension of the cable.

According to another aspect of the disclosure, a spacing of adjacent cable grooves of the small diameter portion in the axial direction of the drum may be greater than a spacing of adjacent cable grooves of the large diameter portion in the axial direction of the drum.

According to another aspect of the disclosure, the drum may be rotatably accommodated in a housing, a covering wall partially covering the drum from an outside in the radial direction of the drum may be provided inside the housing, and a gap dimension of a gap between the slip preventing wall and the covering wall may be smaller than the diameter dimension of the cable.

According to the disclosure, the large diameter portion is provided on one side of the drum in the axial direction, the small diameter portion is provided on the other side of the drum in the axial direction having a diameter gradually decreasing from the large diameter portion to the other side of the drum in the axial direction, and the slip preventing wall disposed between adjacent cable grooves in the axial direction of the drum and preventing the cable from slipping out of the cable grooves is provided in the small diameter portion.

Accordingly, the slip preventing wall provided in the small diameter portion can reliably prevent the cable from slipping out (derailing) from the cable grooves even when a winding position of the cable on the drum is changed and transferred from the large diameter portion to the small diameter portion.

DESCRIPTION OF THE EMBODIMENTS

An embodiment of the disclosure will be described in detail below with reference to the drawings.

Figure 1:
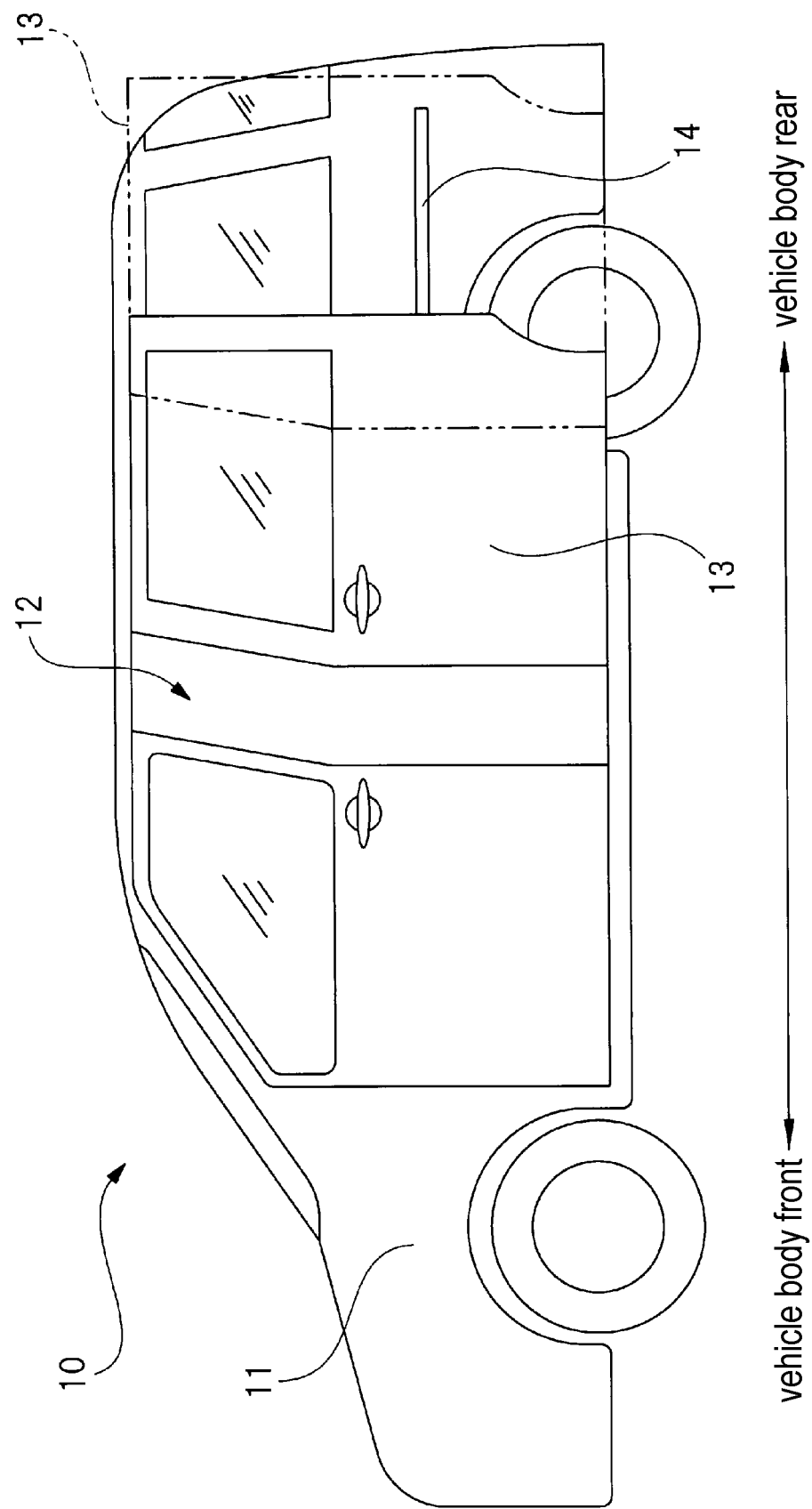
FIG. 1 is a side view of a vehicle in which a drive unit according to the disclosure is mounted.
Figure 2:
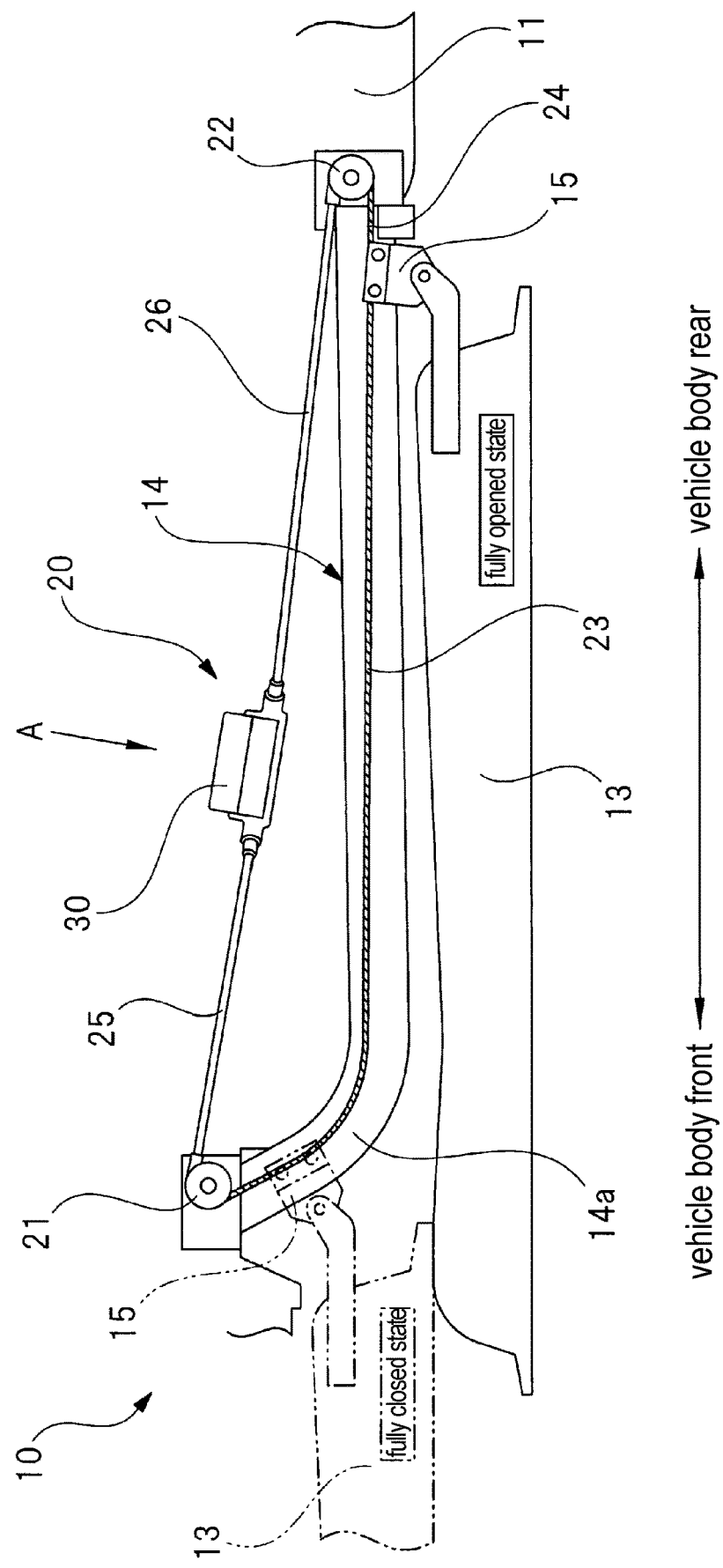
FIG. 2 is a plan view for explaining a structure in which a sliding door is attached to a vehicle.
Figure 3:
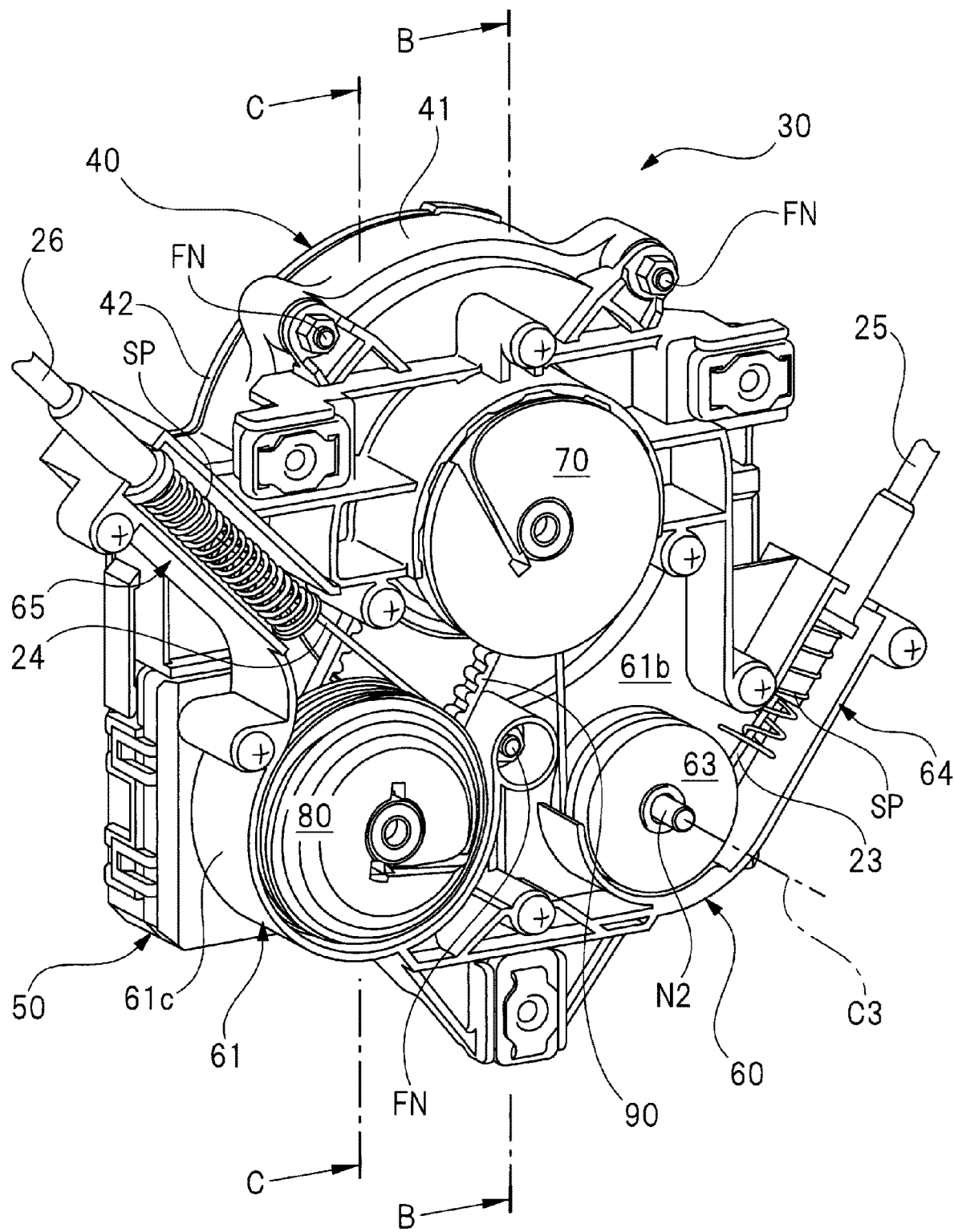
FIG. 3 is a perspective view (without a gear cover) of the drive unit of FIG. 2 taken from the arrow A direction.
Figure 4:
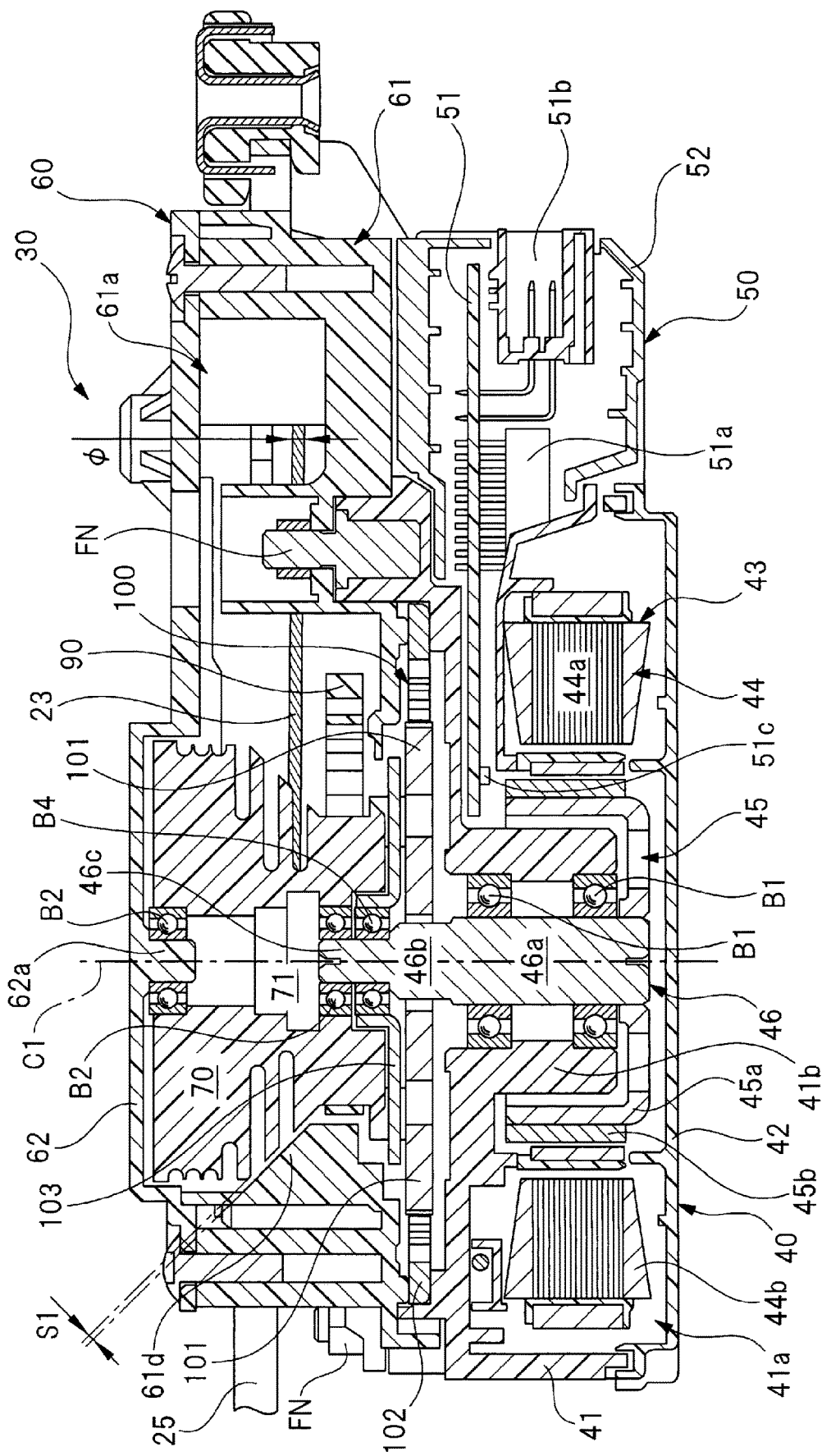
FIG. 4 is a cross-sectional view (with a gear cover) taken along the line B-B of FIG. 3.
Figure 5:
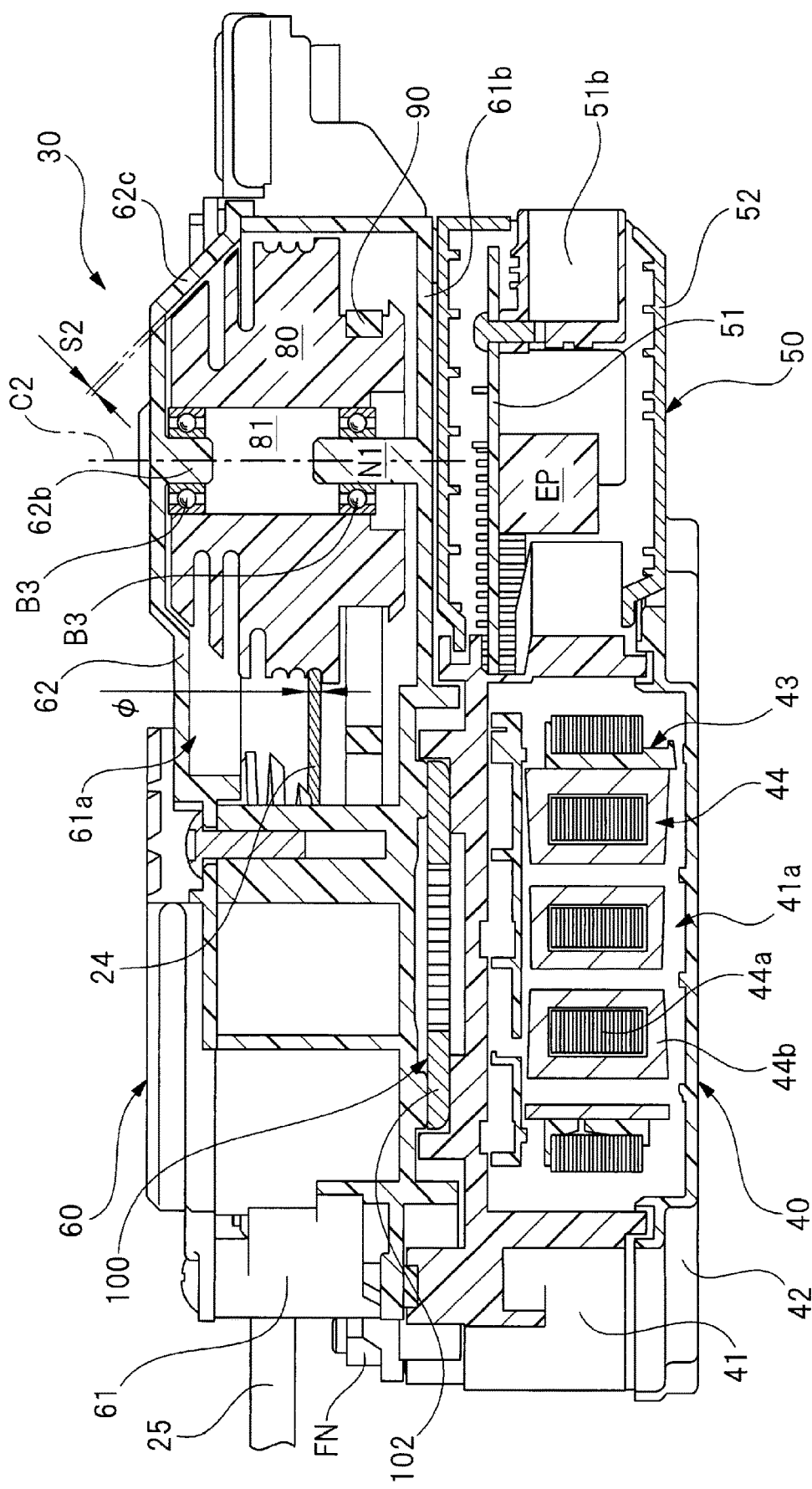
FIG. 5 is a cross-sectional view (with a gear cover) taken along the line C-C of FIG. 3.
Figure 6A:
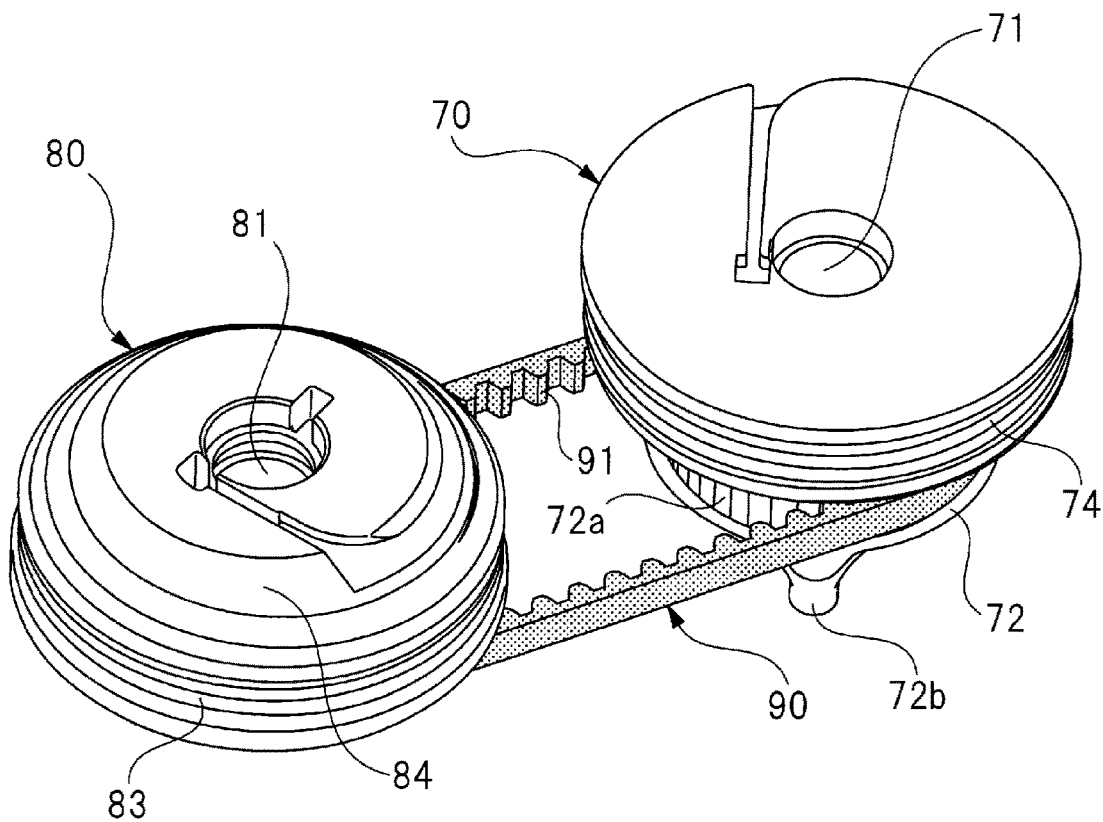
FIGS. 6(*a*) and 6(*b*) are perspective views for describing a closing side drum, an opening side drum, and a drive belt.
Figure 6B:
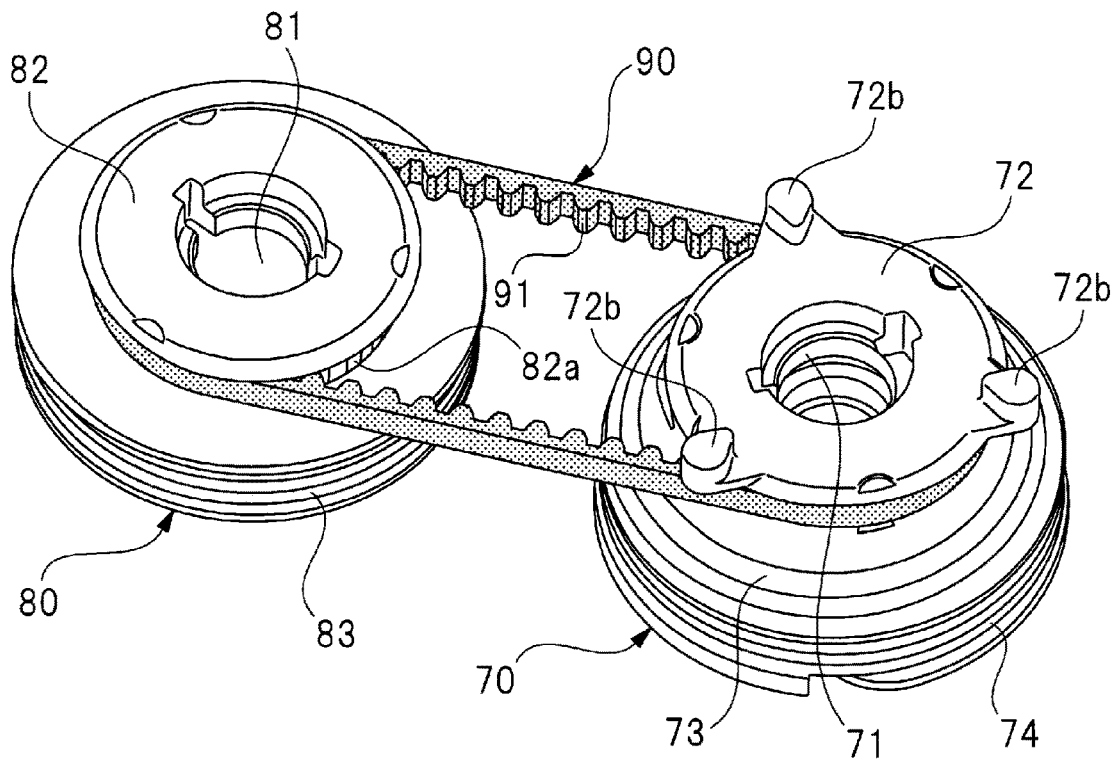
Figure 7:
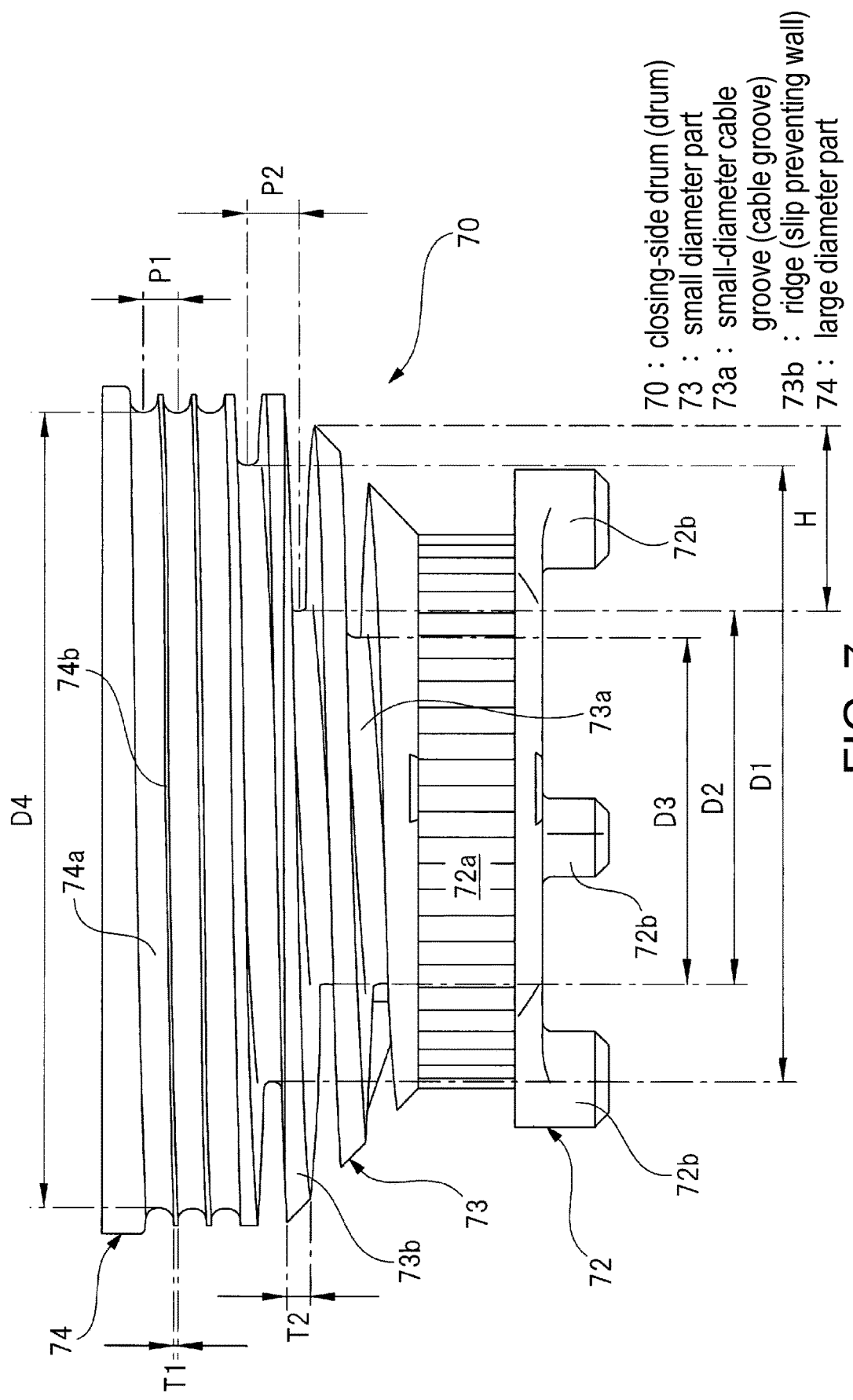
FIG. 7 is a side view for explaining a cable groove of the closing side drum.
Figure 8:
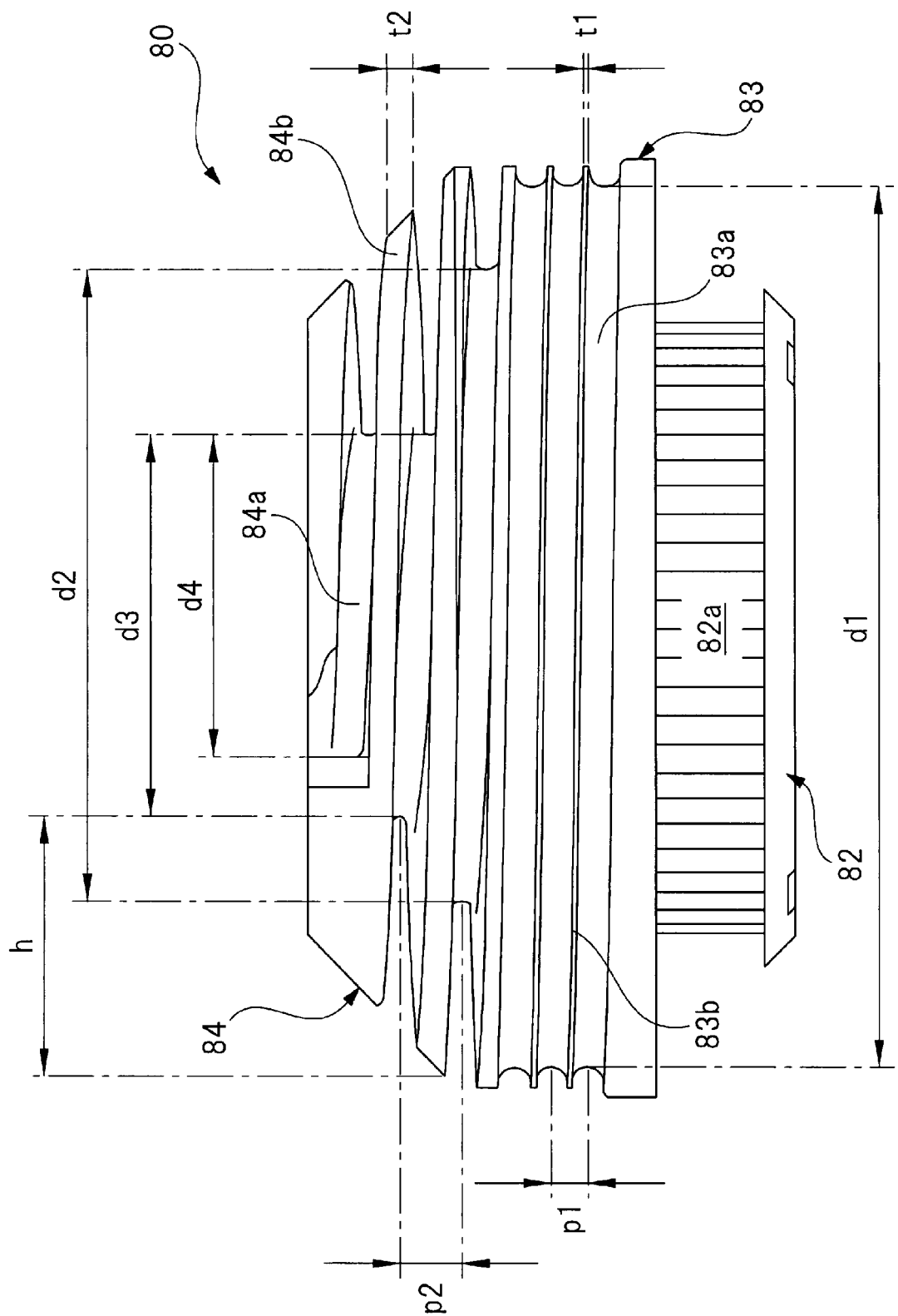
FIG. 8 is a side view for explaining a cable groove of the opening side drum.

FIG. 1 is a side view of a vehicle in which a drive unit according to the disclosure is mounted, FIG. 2 is a plan view for explaining a structure in which a sliding door is attached to a vehicle, FIG. 3 is a perspective view (without a gear cover) of the drive unit of FIG. 2 taken from the arrow A direction, FIG. 4 is a cross-sectional view (with a gear cover) taken along the line B-B of FIG. 3, FIG. 5 is a cross-sectional view (with a gear cover) taken along the line C-C of FIG. 3, FIGS. 6(*a*) and 6(*b*) are perspective views for describing a closing side drum, an opening side drum, and a drive belt, FIG. 7 is a side view for explaining a cable groove of the closing side drum, and FIG. 8 is a side view for explaining a cable groove of the opening side drum.

A vehicle 10 illustrated in FIG. 1 is, for example, a wagon which can carry 8 passengers, a relatively large opening portion 12 being provided on a side of the vehicle body 11 of the vehicle 10. The opening portion 12 is opened or closed by a sliding door (opening and closing body) 13 that is movably provided in the vehicle body 11. The sliding door 13 is guided by a guide rail 14 that is fixed on the side of the vehicle body 11 and moves in the front-rear direction of the vehicle body 11 between a fully open position and a fully closed position. In addition, the opening portion 12 may be opened to a large extent by the sliding door 13 moving to the fully open position (indicated by the two-dot dashed line in the drawing), which makes it easier for passengers to get into and out of the vehicle, to load and unload luggage, and the like.

A roller assembly 15 is provided on a rear side of the sliding door 13 in the vehicle body at a center of the sliding door 13 in a top-bottom direction as illustrated in FIG. 2. The roller assembly 15 moves on the guide rail 14 according to a shape of the guide rail 14, and accordingly the sliding door 13 moves in the front-rear direction of the vehicle body 11 along the side of the vehicle body 11.

A curved portion 14*a* that curves toward the inside of the vehicle (the upper side of the drawing) is provided in the guide rail 14 on a front side of the vehicle body. In addition, when the roller assembly 15 moves to the front side of the vehicle body and passes a portion of the curved portion 14*a*, the sliding door 13 is drawn inward the vehicle body 11, is brought into a [fully closed state] as indicated by the two-dot dashed line in the drawing, and is substantially flush with the side surface of the vehicle body 11.

Further, roller assemblies (not illustrated) are also provided on the front side and at upper and lower portions of the slide door 13 in the vehicle body, in addition to the roller assembly 15. In addition, guide rails (not illustrated) are also provided on each of parts above and below the opening portion 12 of the vehicle body 11 corresponding to the roller assemblies positioned on the upper and lower parts of the sliding door 13. That is, the sliding door 13 is supported by the vehicle body 11 at a total of three locations, and accordingly, stable opening and closing operations with respect to the vehicle body 11 are possible.

A sliding door opening and closing mechanism 20 that automatically opens and closes the sliding door 13 is provided on the side of the vehicle body 11 of the vehicle 10 as illustrated in FIG. 2. The sliding door opening and closing mechanism 20 has a drive unit 30, and the drive unit 30 is fixed to a vehicle body panel (not illustrated) forming the vehicle body 11 and is near to a center of the guide rail 14 in a longitudinal direction.

The sliding door opening and closing mechanism 20 has a pair of reversing pulleys 21 and 22 disposed on each of both sides of the guide rail 14 in the longitudinal direction, a closing side cable (cable) 23 that pulls the sliding door 13 in a closing direction (forward in the vehicle body), and an opening side cable (cable) 24 that pulls the sliding door 13 in an opening direction (rearward in the vehicle body).

In addition, one sides of the closing side cable 23 and the opening side cable 24 in the longitudinal direction are guided to an inside of the drive unit 30. On the other hand, the other sides of the closing side cable 23 and the opening side cable 24 in the longitudinal direction are connected to the roller assembly 15 from the front side of the vehicle body and the rear side of the vehicle body via the pair of reversing pulleys 21 and 22.

Accordingly, when the drive unit 30 is driven forward, the closing side cable 23 is pulled and the sliding door 13 is moved in the closing direction. On the other hand, when the drive unit 30 is driven in reverse, the opening side cable 24 is pulled and the sliding door 13 is driven in the opening direction. That is, the drive unit 30 opens and closes the sliding door 13.

Further, the portions of the pair of cables 23 and 24 disposed outside the vehicle body 11 are hidden by a guide groove (not illustrated) provided inside the guide rail 14. Accordingly, the pair of cables 23 and 24 are not exposed to outside. Thus, the pair of cables 23 and 24 can be protected from rainwater, dust, and the like, thus improving the appearance of the vehicle 10.

In addition, outer casings 25 and 26 that cover the circumferences of the pair of cables 23 and 24 and slidably hold the pair of cables 23 and 24 are provided between the pair of reversing pulleys 21 and 22 and the drive unit 30. The outer casings 25 and 26 have flexibility, and sliding grease (not illustrated) is applied inside. Accordingly, the pair of cables 23 and 24 can be protected, and the pair of cables 23 and 24 can smoothly slide in the pair of outer casings 25 and 26.

The drive unit 30 includes a motor section 40, a board accommodation section 50, and a drum accommodation section 60 as illustrated in FIG. 3 to FIG. 5, and these parts are integrated by a plurality of fastening members FN (only three members are illustrated in the drawings). In addition, the drum accommodation section 60 is the largest part among the motor section 40, the board accommodation section 50, and the drum accommodation section 60, and when the drum accommodation section 60 is viewed from an axial direction of a rotating shaft 46, the motor section 40 and the board accommodation section 50 each substantially fall inside a projection range of the drum accommodation section 60.

By substantially bringing each of the motor section 40 and the board accommodation section 50 inside the projection range of the drum accommodation section 60 and arranging each of the motor section 40 and the board accommodation section 50 in a direction orthogonal to the axial direction of the rotating shaft 46, a thickness dimension of the drive unit 30 can be prevented from increasing in the axial direction of the rotating shaft 46.

The motor section 40 includes a motor housing 41 that is formed of a resin material such as plastic and a flat motor cover 42 that closes an opening portion 41*a* of the motor housing 41. Further, the motor cover 42 may also be formed of a resin material such as plastic so that reduction in weight of the motor section 40 can be achieved.

The motor housing 41 is formed in a flat and substantially cylindrical shape and accommodates a flat brushless motor (electric motor) 43 therein. The brushless motor 43 includes a stator 44 that is formed in a ring shape and a rotor 45 that rotates inward in a radial direction of the stator 44.

The stator 44 is firmly fixed to the motor housing 41 using a fixing screw and the like which is not illustrated. The stator 44 includes a stator core 44*a* that is formed by laminating a plurality of steel plates (not illustrated) formed of a magnetic material and a plurality of teeth (not illustrated) around which U-phase, V-phase, and W-phase coils 44*b* are wound with a predetermined number of turns and a method of winding are provided inside the stator core 44*a* in the radial direction.

The rotor 45 includes a rotor main body 45*a* of which a cross-section is formed in substantially a U shape. The rotor main body 45*a* is formed by causing a steel plate to undergo press processing or the like, and a plurality of permanent magnets 45*b* is fixed outside the rotor main body in the radial direction and aligned side by side in a circumferential direction thereof. On the other hand, a base end of the rotating shaft 46 in the axial direction formed of a round steel bar is fixed inside the rotor main body 45*a* in the radial direction.

The rotating shaft 46 includes a large diameter portion 46*a* having a base end in the axial direction fixed to the center of the rotor main body 45*a*, a sun gear 46*b* forming a reduction mechanism 100, and a small diameter portion 46*c* rotatably supporting the closing side drum 70. In addition, the rotating shaft 46 is rotatably supported by the motor housing 41.

Specifically, a boss portion 41*b* that is thicker than other parts of the motor housing 41 is provided at substantially a center of the motor housing 41. A pair of large diameter ball bearings B1 are attached inward in the radial direction of the boss portion 41*b*. The large diameter portion 46*a* of the rotating shaft 46 is rotatably supported by the large diameter ball bearings B1. Further, the pair of large diameter ball bearings B1 are separately provided on both sides of the boss portion 41*b* in the axial direction. Accordingly, the rotating shaft 46 can stably rotate at a high speed without shaking.

The board accommodation section 50 is provided close to the motor section 40 and accommodates a control board 51 that controls a rotation state of the brushless motor 43 inside the board accommodation section 50. A switching element 51*a* that sequentially supplies a drive current to each of the U-phase, V-phase, and W-phase coils 44*b* forming the brushless motor 43 at a high speed is installed in the control board 51.

In addition, a connector connection portion 51*b* to which an external connector (not illustrated) provided on the vehicle 10 side is connected is electrically connected to the control board 51. Accordingly, a drive current is supplied from the external connector to the drive unit 30.

Furthermore, a plurality of Hall integrated circuits (ICs) 51*c* (only one is illustrated in FIG. 4) for detecting a rotation state of the brushless motor 43 is installed on the control board 51. Specifically, the plurality of Hall ICs 51*c* is disposed close to the permanent magnets 45*b* provided on the rotor 45. Accordingly, the plurality of Hall ICs 51*c* generates a pulse signal (rectangular wave signal) at predetermined times according to rotation of the rotor 45.

In addition, a central processing unit (CPU which is not illustrated) that receives inputs of pulse signals from the plurality of Hall ICs 51*c* is installed on the control board 51. Accordingly, the CPU can ascertain a rotation state (a rotation speed, a rotation direction, etc.) of the rotor 45 and optimally control the switching element 51*a*. Thus, the rotation state of the brushless motor 43 is accurately controlled. Further, other electronic components EP such as a capacitor are also installed on the control board 51 as illustrated in FIG. 5.

Furthermore, a part of a housing 52 (not illustrated in detail) forming an outer shell of the board accommodation section 50 is formed of an aluminum material or the like having a high thermal conductivity. Accordingly, heat of the switching element 51*a* reaching a high temperature during an operation of the brushless motor 43 can be quickly radiated to the outside.

The drum accommodation section 60 includes a drum housing 61 that is formed of a resin material such as plastic and a flat drum cover 62 that closes an opening portion 61*a* of the drum housing 61. Further, the drum cover 62 may also be formed of a resin material such as plastic, and thus reduction in weight of the drum accommodation section 60 can be achieved. Here, the drum housing 61 and the drum cover 62 correspond to a housing of the disclosure.

The drum housing 61 is formed in a substantially flat potbelly shape and includes a bottom wall portion 61*b* and a side wall portion 61*c* provided upright around the bottom wall portion 61*b*. In addition, the closing side drum 70, the opening side drum 80, and a direction changing pulley 63 are rotatably accommodated inside the drum housing 61. Here, all of the closing side drum 70, the opening side drum 80, and the direction changing pulley 63 are formed of a resin material such as plastic, and accordingly, reduction in weight of the drive unit 30 can be achieved while reducing the value of the moment of inertia of each of the elements.

The closing side drum 70 is provided coaxially with the rotating shaft 46 of the motor section 40 and disposed substantially at the center of the drum housing 61 that is a portion on the motor section 40 side. In addition, the closing side cable 23 that pulls the sliding door 13 (see FIG. 2) in the closing direction is wound on the closing side drum 70.

In addition, the opening side drum 80 is provided alongside the direction changing pulley 63 in a portion of the drum housing 61 on the board accommodation section 50 side. In addition, an axis C1 (see FIG. 4) of the closing side drum 70, an axis C2 (see FIG. 5) of the opening side drum 80, and an axis C3 (see FIG. 3) of the direction changing pulley 63 are parallel to each other, and line segments connecting these axes C1, C2, and C3 form substantially a regular triangle. In addition, the opening side cable 24 that pulls the sliding door 13 in the opening direction is wound on the opening side drum 80.

A through hole 71 penetrating the closing side drum 70 in an axial direction is provided at the rotation center of the closing side drum 70, and a pair of small-diameter ball bearings B2 are attached on both sides of the through hole 71 in the axial direction as illustrated in FIG. 4. In addition, the small-diameter ball bearing B2 on a base end side of the closing side drum 70 in the axial direction (the motor section 40 side) is attached to the small diameter portion 46c of the rotating shaft 46. Meanwhile, the small-diameter ball bearing B2 on the tip end side of the closing side drum 70 (the side opposite to the motor section 40 side) in the axial direction is attached to a first support protruding portion 62a that is provided integrally with the drum cover 62 inside thereof. Accordingly, the closing side drum 70 can smoothly rotate with respect to the axis C1. As described above, the closing side drum 70 is rotatably supported by the small diameter portion 46c provided around the axis C1 and the first support protruding portion 62a provided around the axis C1.

A through hole 81 penetrating the opening side drum 80 in an axial direction is provided at the rotation center of the opening side drum 80, and a pair of small-diameter ball bearings B3 is attached on both sides of the through hole 81 in the axial direction as illustrated in FIG. 5. In addition, the small-diameter ball bearing B3 on a base end side of the opening side drum 80 in the axial direction (the motor section 40 side) is attached to a first support pin N1 provided integrally with the bottom wall portion 61b. Meanwhile, the small-diameter ball bearing B3 on the tip end side of the opening side drum 80 (the side opposite to the motor section 40 side) is attached to a second support protruding portion 62b that is provided integrally with the drum cover 62 inside thereof. Accordingly, the opening side drum 80 can smoothly rotate with respect to the axis C2. As described above, the opening side drum 80 is rotatably supported by the first support pin N1 provided around the axis C2 and the second support protruding portion 62b provided around the axis C2.

In addition, the direction changing pulley 63 switches a direction of the closing side cable 23 drawn inside the drum housing 61 toward the closing side drum 70 and is rotatably supported by the second support pin N2 provided integrally with the bottom wall portion 61b as illustrated in FIG. 3. Further, specific structures of the closing side drum 70 and the opening side drum 80 and a disposition state thereof inside the drum housing 61 will be described in more detail below.

A closing side cable guide portion 64 and an opening side cable guide portion 65 are integrally provided on the side wall portion 61c forming the drum housing 61 as illustrated in FIG. 3. These cable guides 64 and 65 have a function of guiding the closing side cable 23 and the opening side cable 24 to the inside of the drum housing 61 and each are formed in a substantially box shape. In addition, the closing side cable guide portion 64 is disposed near the direction changing pulley 63 and guides the closing side cable 23 to the direction changing pulley 63 from the motor section 40 side. Meanwhile, the opening side cable guide portion 65 is disposed near the opening side drum 80 and guides the opening side cable 24 to the opening side drum 80 from the motor section 40 side.

Further, coil springs SP are accommodated inside each of the pair of cable guides 64 and 65. These coil springs SP bias each of the outer casings 25 and 26 to the outside of the drum housing 61. Accordingly, slight slack in the pair of cables 23 and 24 that have been stretched due to change over time can be absorbed in the outside of the drum housing 61.

Here, the opening side cable 24 that pulls the sliding door 13 (see FIG. 2) in the opening direction is wound on the opening side drum 80 by a driving force of the opening side drum 80. The driving force of the opening side drum 80 in this case is transmitted from the closing side drum 70 via a drive belt 90. Further, a specific structure of the drive belt 90 will be described in more detail below.

The closing side drum 70 is disposed coaxially with the brushless motor 43 as illustrated in FIG. 4 and driven (rotated) by the brushless motor 43 with a large rotational torque. Specifically, a reduction mechanism 100 that reduces rotation of the rotating shaft 46 of the brushless motor 43 and increases a rotational torque of the closing side drum 70 is provided between the brushless motor 43 and the closing side drum 70.

The reduction mechanism 100 is a planetary gear decelerator and includes a sun gear 46b provided integrally with the rotating shaft 46, three planetary gears 101 (only two are illustrated in the drawing) that mesh with the sun gear 46b and are provided to be rollable around the sun gear 46b, an outer gear 102 that is provided around the planetary gears 101 and meshes with the planetary gears 101, and a planetary carrier 103 that holds the three planetary gears 101 and rotates according to revolution movement of the planetary gears 101.

More specifically, the outer gear 102 is formed in a ring shape and sandwiched between the motor housing 41 and the drum housing 61. That is, the outer gear 102 is firmly fixed to each of the housings 41 and 61 so as not to rotate with respect to them. In addition, the planetary carrier 103 transmits a rotation force to the closing side drum 70, and the planetary carrier 103 is connected to the closing side drum 70 to be rotatable integrally therewith.

Further, a small-diameter ball bearing B4 is attached inside the planetary carrier 103 in a radial direction, and the small-diameter ball bearing B4 is attached to the small diameter portion 46c of the rotating shaft 46. Accordingly, the planetary carrier 103 can smoothly rotate with respect to the rotating shaft 46.

To describe an operation of the reduction mechanism 100, first, the rotating shaft 46 of the brushless motor 43 is rotated at a high speed. Then, the sun gear 46b is also rotated at a high speed according to the rotation of the rotating shaft 46. At this moment, the three planetary gears 101 revolve around the sun gear 46b while rolling since the outer gear 102 is fixed to the housings 41 and 61. The revolution speed of the planetary gears 101 at that moment is much lower than the rotation speed of the sun gear 46b. Accordingly, the planetary carrier 103 holding the planetary gears 101 is rotated at a low speed with a high torque, and further the closing side drum 70 is rotated with a high rotational torque.

The drum housing 61 accommodates the closing side drum 70, the opening side drum 80, and the drive belt 90 in the disposition relationship illustrated in FIG. 6(a) and FIG. 6(b).

The closing side drum 70 corresponds to a drum of the disclosure and has a shape as illustrated in FIG. 6(a), FIG. 6(b) and FIG. 7. The closing side drum 70 is formed of a resin material such as plastic in a substantial disc shape, and a through hole 71 having the pair of small-diameter ball bearings B2 (see FIG. 4) attached therearound is formed at a rotation center of the drum.

Here, the base end side of the closing side drum 70 in the axial direction (on the lower side in the drawing) is set as the other side of the drum in the axial direction of the disclosure, and a tip end side of the closing side drum 70 (on the upper side in the drawing) in the axial direction is set as one side of the drum in the axial direction of the disclosure as illustrated in FIG. 7.

A closing side power transmitting portion 72 is provided at the base end of the closing side drum 70 in the axial direction. The closing side power transmitting portion 72 includes a closing side belt engaging portion 72a and three engaging claws 72b. The closing side belt engaging portion 72a includes a plurality of irregularities (which are not illustrated in detail), and rubber teeth 91 of the drive belt 90 mesh with the closing side belt engaging portion 72a.

In addition, the three engaging claws 72b are provided at equal intervals (120-degree intervals) in the circumferential direction of the closing side drum 70 and project in the axial direction of the closing side drum 70. In addition, these engaging claws 72b are hooked by the planetary carrier 103 (see FIG. 4) of the reduction mechanism 100. Accordingly, a rotation force of the planetary carrier 103 is transmitted to the closing side drum 70.

A small diameter portion 73 on which the closing side cable 23 is wound is provided at the base end of the closing side drum 70 in the axial direction and on the drum cover 62 side (the upper side in FIG. 7) of the closing side power transmitting portion 72. A spiral small diameter cable groove (cable groove) 73a is provided in the small diameter portion 73, and a winding diameter of the small diameter cable groove 73a on which the closing side cable 23 is wound gradually decreases in an order of D1, D2, and D3 toward the closing side power transmitting portion 72 (D1>D2>D3). That is, the small diameter portion 73 has a diameter gradually decreasing from a large diameter portion 74, which will be described below, to the base end side of the closing side drum 70 in the axial direction.

The large diameter portion 74 on which the closing side cable 23 is wound is provided on the tip end side of the closing side drum 70 in the axial direction (the drum cover 62 side). The large diameter portion 74 has a larger diameter than the small diameter portion 73, and a spiral large diameter cable groove (cable groove) 74a is provided in the large diameter portion 74. In addition, a winding diameter of the large diameter cable groove 74a on which the closing side cable 23 is wound is fixed to D4 through the large diameter cable groove 74a.

Further, a winding diameter D4 of the large diameter cable groove 74a is greater than a winding diameter D1 with respect to the largest diameter portion of the small diameter cable groove 73a (D4>D1).

In addition, the large diameter cable groove 74a is connected to the small diameter cable groove 73a in a substantially center portion of the closing side drum 70 in the axial direction. That is, the large diameter cable groove 74a and the small diameter cable groove 73a constitute one continuous spiral cable groove.

An end of the closing side cable 23 wound on the closing side drum 70 is fixed to the tip end side of the closing side drum 70 in the axial direction, that is, the large diameter portion 74 side. That is, as the closing side cable 23 is wound on the closing side drum 70, the closing side cable 23 is gradually wound from the large diameter cable groove 74a to the small diameter cable groove 73a. At this moment, just before the end of winding of the closing side cable 23 (when the sliding door 13 is substantially fully closed), the closing side cable 23 is wound on a portion of the small diameter cable groove 73a in which a winding diameter D3 is the smallest.

Here, the large diameter cable groove 74a has the same winding diameter D4 throughout the region. Accordingly, even when the closing side cable 23 is wound on the groove, the closing side cable 23 is less likely to slip out of the large diameter cable groove 74a. Therefore, a groove pitch P1 of the large diameter cable grooves 74a, that is, a spacing of adjacent large diameter cable grooves 74a of the large diameter portion 74 in the axial direction of the closing side drum 70 is as small as possible, and accordingly, an increase in dimensions of the closing side drum 70 in the axial direction is curbed. More specifically, a partition wall 74b having a thickness dimension of about T1 (about 1.0 mm) is provided between adjacent large diameter cable grooves 74a in the axial direction of the closing side drum 70.

On the other hand, a winding diameter of the small diameter cable groove 73a on which the cable is wound gradually decreases from D1 to D2 and to D3 in this order as the groove gets closer to the closing side power transmitting portion 72. For this reason, there is concern of the closing side cable 23 slipping out of the small diameter cable grooves 73a as the closing side cable 23 is wound on the small diameter cable groove 73a with the same groove pitch P1 as that of the large diameter cable grooves 74a and with the partition wall 74b having the same thickness dimension of T1.

Thus, in the present embodiment, a groove pitch P2 of the small diameter cable grooves 73a, that is, a spacing of adjacent small diameter cable groove 73a in the axial direction of the closing side drum 70 in the small diameter portion 73, is set to be greater than the groove pitch P1 of the large diameter cable grooves 74a (P2>P1). Accordingly, a partition wall 73b having a relatively large thickness dimension of T2 (about 5.0 mm) is provided between adjacent small diameter cable grooves 73a in the axial direction of the closing side drum 70 (T2>T1).

By increasing a thickness dimension of the partition wall 73b and setting it to T2, rigidity of the partition wall 73b can be sufficiently enhanced. Thus, a height dimension of the partition wall 73b can be increased to "H" of FIG. 7 (increasing a depth dimension of the small diameter cable groove 73a), and accordingly, the closing side cable 23 can be reliably prevented from slipping out of the small diameter cable groove 73a.

Here, the partition wall 73b provided in the small diameter portion 73 corresponds to a slip preventing wall of the disclosure. In addition, a height dimension of the partition wall 73b in the radial direction of the closing side drum 70 is set to be greater than a diameter dimension φ (see FIG. 4) of the closing side cable 23.

Furthermore, an inclined portion 61d inclining according to an outer shape of the portion of the closing side drum 70 in which the small diameter portion 73 is provided is provided in a part of the drum housing 61 around the closing side drum 70 as illustrated in FIG. 4. The inclined portion 61d partially covers the closing side drum 70 from the outside in the radial direction and corresponds to a covering wall of the disclosure. In addition, the inclined portion 61d faces a tip end part of the partition wall 73b, and a gap dimension S1 of the gap between the partition wall 73b and the inclined portion 61d is set to be smaller than the diameter dimension φ of the closing side cable 23 (S1<φ). Also due to this configuration, the closing side cable 23 can be reliably prevented from slipping out of the small diameter cable groove 73a.

As described above, starting of winding of the closing side cable 23 with respect to the closing side drum 70 is set to be at the large diameter cable groove 74a, and ending of winding of the closing side cable 23 with respect to the closing side drum 70 is set to be at the small diameter cable groove 73a. Thus, it is possible to quickly move the sliding door 13 at the beginning of closing and slowly move the sliding door 13 just before the end of closing, without controlling a rotation speed of the brushless motor 43. That is, a movement speed of the sliding door 13 can be varied regardless of control of the brushless motor 43.

The opening side drum 80 also corresponds to the drum of the disclosure and has the shape illustrated in FIG. 6(a), FIG. 6(b) and FIG. 8. The opening side drum 80 is formed of a resin material such as plastic in a substantial disc shape, and a through hole 81 having the pair of small-diameter ball bearings B3 (see FIG. 5) attached therearound is formed at a rotation center of the drum.

Here, the base end side of the opening side drum 80 in the axial direction (on the lower side in the drawing) is set as one side of the drum in the axial direction of the disclosure, and a tip end side of the opening side drum 80 in the axial direction (on the upper side in the drawing) is set as the other side of the drum in the axial direction of the disclosure as illustrated in FIG. 8.

An opening side power transmitting portion 82 is provided at the base end of the opening side drum 80 in the axial direction. The opening side power transmitting portion 82 includes an opening side belt engaging portion 82a. The opening side belt engaging portion 82a includes a plurality of irregularities (which are not illustrated in detail), and the rubber teeth 91 of the drive belt 90 mesh with the opening side belt engaging portion 82a. Further, the opening side drum 80 is driven by the brushless motor 43 via the drive belt 90 and the closing side drum 70. Thus, the opening side drum 80 does not have the engaging claws 72b provided in the closing side drum 70 (see FIG. 7).

A large diameter portion 83 on which the opening side cable 24 is wound is provided in a portion on the base end side of the opening side drum 80 in the axial direction and on the drum cover 62 (the upper side in FIG. 8) side of the opening side power transmitting portion 82. A spiral large diameter cable groove (cable groove) 83a is provided in the large diameter portion 83, and a winding diameter of the large diameter cable groove 83a on which the opening side cable is wound is fixed to d1 which is substantially equal to an outer diameter dimension of the large diameter portion 83 through the large diameter cable groove 83a.

A small diameter portion 84 on which the opening side cable 24 is wound is provided on the tip end side of the opening side drum 80 (the drum cover 62 side). The small diameter portion 84 has a smaller diameter than the large diameter portion 83, and specifically, the small diameter portion 84 has a diameter gradually decreasing from the large diameter portion 83 toward the tip end of the opening side drum 80 in the axial direction. A spiral small diameter cable groove (cable groove) 84a is provided in the small diameter portion 84. In addition, a winding diameter of the small diameter cable groove 84a on which the opening side cable 24 is wound gradually decreases from d2, d3, and d4 in this order as the groove gets closer to the tip end side of the opening side drum 80 in the axial direction (the upper side in FIG. 8) (d2>d3>d4).

Further, a winding diameter d1 of the large diameter cable groove 83a is set to be greater than a winding diameter d2 of a largest diameter portion of the small diameter cable groove 84a (d1>d2).

In addition, the large diameter cable groove 83a is connected to the small diameter cable groove 84a in a substantially center portion of the opening side drum 80 in the axial direction. That is, the large diameter cable groove 83a and the small diameter cable groove 84a constitute one continuous spiral cable groove.

An end of the opening side cable 24 wound on the opening side drum 80 is fixed to the tip end side of the opening side drum 80 in the axial direction, that is, the small diameter portion 84 side. That is, as the opening side cable 24 is wound on the opening side drum 80, the opening side cable 24 is gradually wound from the small diameter cable groove 84a to the large diameter cable groove 83a. At this moment, just before the end of winding of the opening side cable 24 (when the sliding door 13 is substantially fully opened), the opening side cable 24 is wound on a portion of the large diameter cable groove 83a in which a winding diameter is the largest d1.

Here, the large diameter cable groove 83a has the same winding diameter d1 through the groove. Accordingly, even when the opening side cable 24 is wound, the opening side cable 24 does not easily slip out of the large diameter cable groove 83a. Thus, a groove pitch p1 of the large diameter cable grooves 83a, that is, a spacing of adjacent large diameter cable grooves 83a of the opening side drum 80 in the axial direction of the large diameter portion 83 is as small as possible, and accordingly, an increase in dimensions of the opening side drum 80 in the axial direction is curbed. More specifically, a partition wall 83b having a thickness dimension of about t1 (about 1.0 mm) is provided between adjacent large diameter cable grooves 83a in the axial direction of the opening side drum 80.

On the other hand, a winding diameter of the small diameter cable groove 84a on which the cable is wound gradually decreases from d2, d3, and d4 in this order as the groove gets closer to the tip end side of the opening side drum 80 in the axial direction. For this reason, there is concern of the opening side cable 24 slipping out of the small diameter cable groove 84a as the opening side cable 24 is wound on the small diameter cable groove 84a with the same groove pitch p1 as that of the large diameter cable groove 83a and with the partition wall 74b having the same thickness dimension of t1.

Thus, in the present embodiment, a groove pitch p2 of the small diameter cable grooves 84a, that is, a spacing of adjacent small diameter cable grooves 84a in the axial direction of the opening side drum 80 in the small diameter portion 84, is set to be greater than the groove pitch p1 of the large diameter cable grooves 83a (p2>p1). Accordingly, a partition wall 84b having a relatively large thickness dimension of t2 (about 5.0 mm) is provided between adjacent small diameter cable grooves 84a in the axial direction of the opening side drum 80 (t2>t1).

By increasing the thickness dimension of the partition wall 84b as described above, rigidity of the partition wall 84b can be sufficiently enhanced. Thus, a height dimension of the partition wall 84b can be increased to "h" of FIG. 8 (increasing a depth dimension of the small diameter cable groove 84a), and accordingly, the opening side cable 24 can be reliably prevented from slipping out of the small diameter cable grooves 84a.

Here, the partition wall 84b provided in the small diameter portion 84 corresponds to a slip preventing wall in the disclosure. In addition, a height dimension of the partition wall 84b in the radial direction of the opening side drum 80 is set to be greater than a diameter dimension φ (see FIG. 5) of the opening side cable 24.

Furthermore, an inclined portion 62c inclining according to an outer shape of the portion of the opening side drum 80 in which the small diameter portion 84 is provided is provided in a part of the drum cover 62 around the opening side drum 80 as illustrated in FIG. 5. The inclined portion 62c partially covers the opening side drum 80 from the outside in the radial direction and corresponds to a covering wall of the disclosure. In addition, the inclined portion 62c faces a tip end part of the partition wall 84bb, and a gap dimension S2 of the gap between the partition wall 84b and the inclined portion 62c is set to be smaller than the diameter dimension φ of the opening side cable 24 (S2<φ). Also due to the configuration, the opening side cable 24 can be reliably prevented from slipping out of the small diameter cable groove 84a.

The drive belt 90 that transmits a driving force of the closing side drum 70 to the opening side drum 80 is provided between the closing side drum 70 and the opening side drum 80 as indicated by the hatched part of FIG. 6(a) and FIG. 6(b). The drive belt 90 is formed of an elastic material such as natural rubber having flexibility in a ring shape, and a plurality of rubber teeth 91 that meshes with both the closing side belt engaging portion 72a and the opening side belt engaging portion 82a is provided inward the drive belt 90 integrally therewith.

Here, although not illustrated, a reinforcing member (e.g., glass fiber, carbon fiber, etc.) that prevents the drive belt 90 from stretching when a high load is applied thereto is embedded inside the drive belt 90. Accordingly, a driving force of the closing side drum 70 is transmitted to the opening side drum 80 with high efficiency, and further the occurrence of a rotation difference between the closing side drum 70 and the opening side drum 80 is prevented.

In addition, the drive belt 90 has a function of a timing belt that adjusts a rotation time of the closing side drum 70 to that of the opening side drum 80.

Specifically, at a timing at which the closing side cable 23 (see FIG. 3) is wound on the small diameter cable groove 73a (see FIG. 7) of the small diameter portion 73 of the closing side drum 70, the opening side cable 24 (see FIG. 3) is wound on the small diameter cable groove 84a (see FIG. 8) of the small diameter portion 84 of the opening side drum 80 (state A). In this "state A," the sliding door 13 is moved from a predetermined position on the opening portion 12, that is, a substantial center on the path between a full closing position and a full opening position of the sliding door 13, to a position side at which the opening portion 12 is fully closed.

Meanwhile, at a timing at which the opening side cable 24 is wound on the large diameter cable groove 83a (see FIG. 8) of the large diameter portion 83 of the opening side drum 80, the closing side cable 23 is wound on the large diameter cable groove 74a (see FIG. 7) of the large diameter portion 74 of the closing side drum 70 (state B). In this "state B," the sliding door 13 is moved from the predetermined position on the opening portion 12, that is, the substantial center on the path between the full closing position and the full opening position of the sliding door 13, to a position side at which the opening portion 12 is fully opened.

Next, an operation of the drive unit 30 formed as described above will be described in detail using the drawings.

Figure 9A:
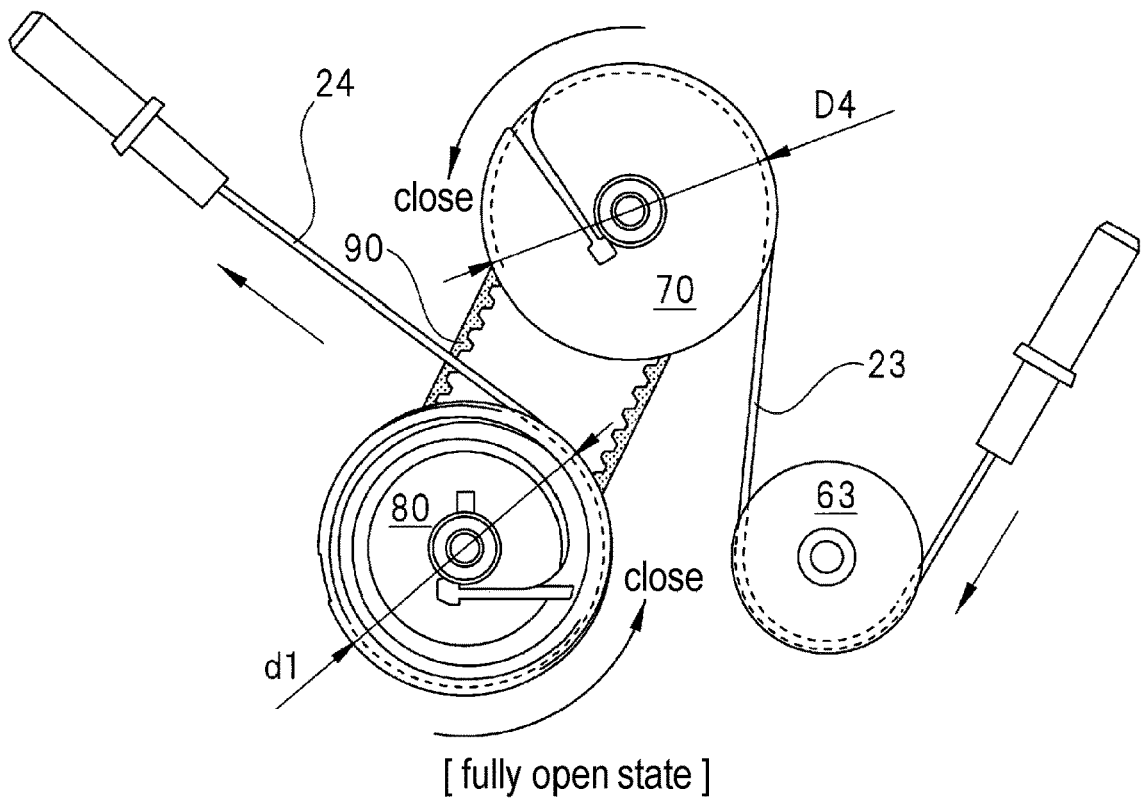
FIG. 9(*a*) is a view illustrating a [fully open state] where an opening side cable is wound on the opening side drum, and FIG. 9(*b*) is a view illustrating a [fully closed state] where a closing side cable is wound on the closing side drum.
Figure 9B:
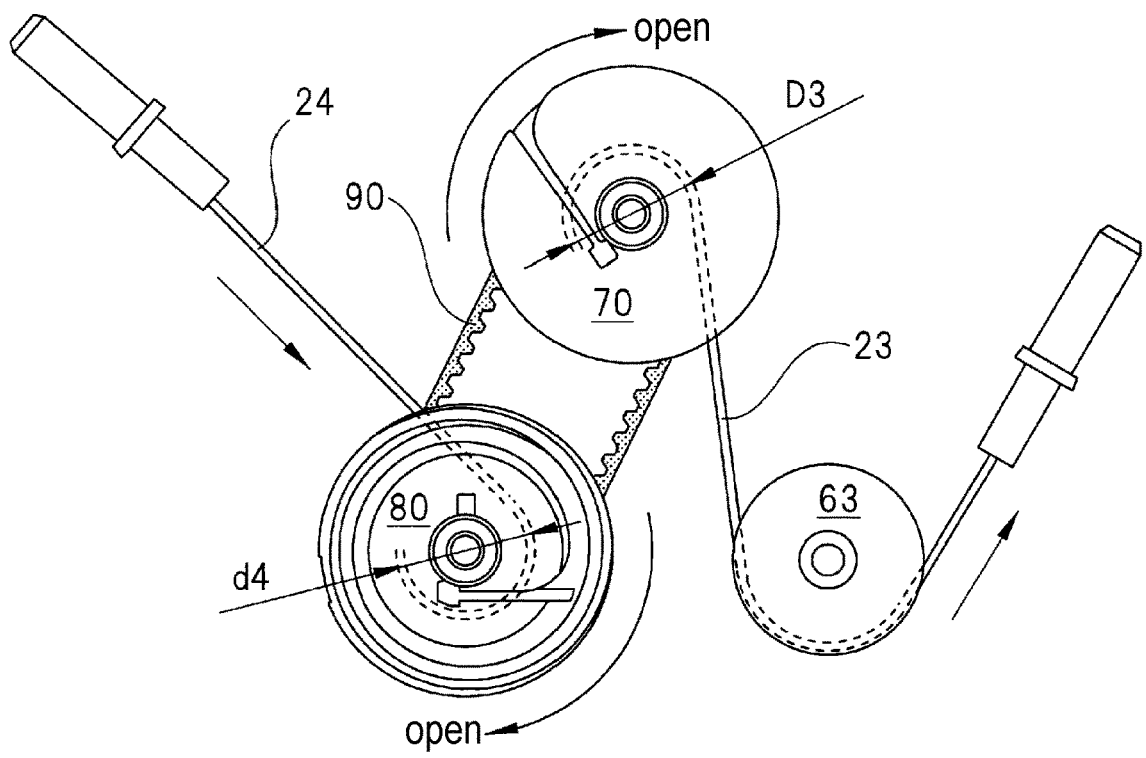
Figure 10:
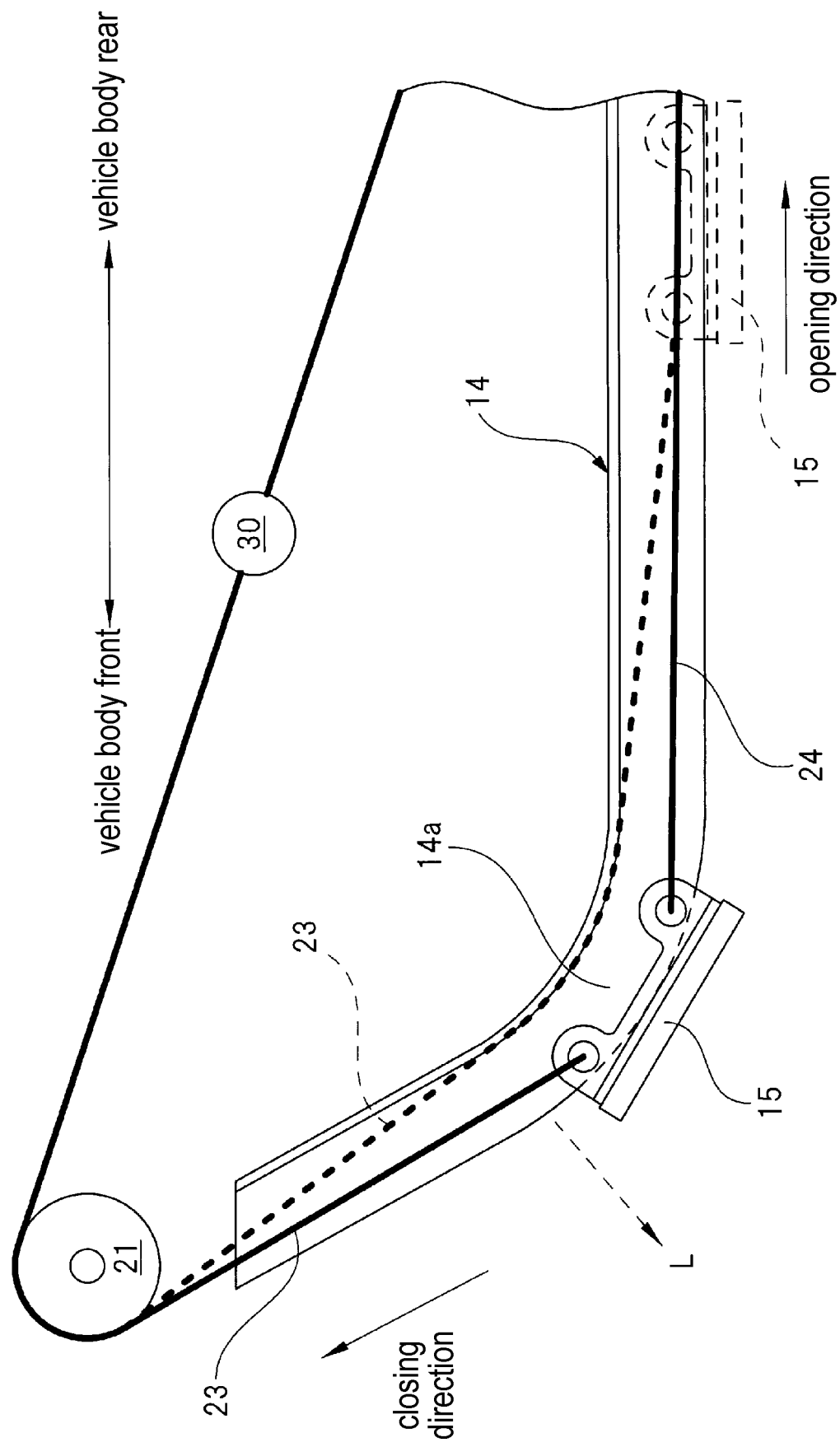
FIG. 10 is an explanatory view for explaining a change in cable length.
Figure 11:
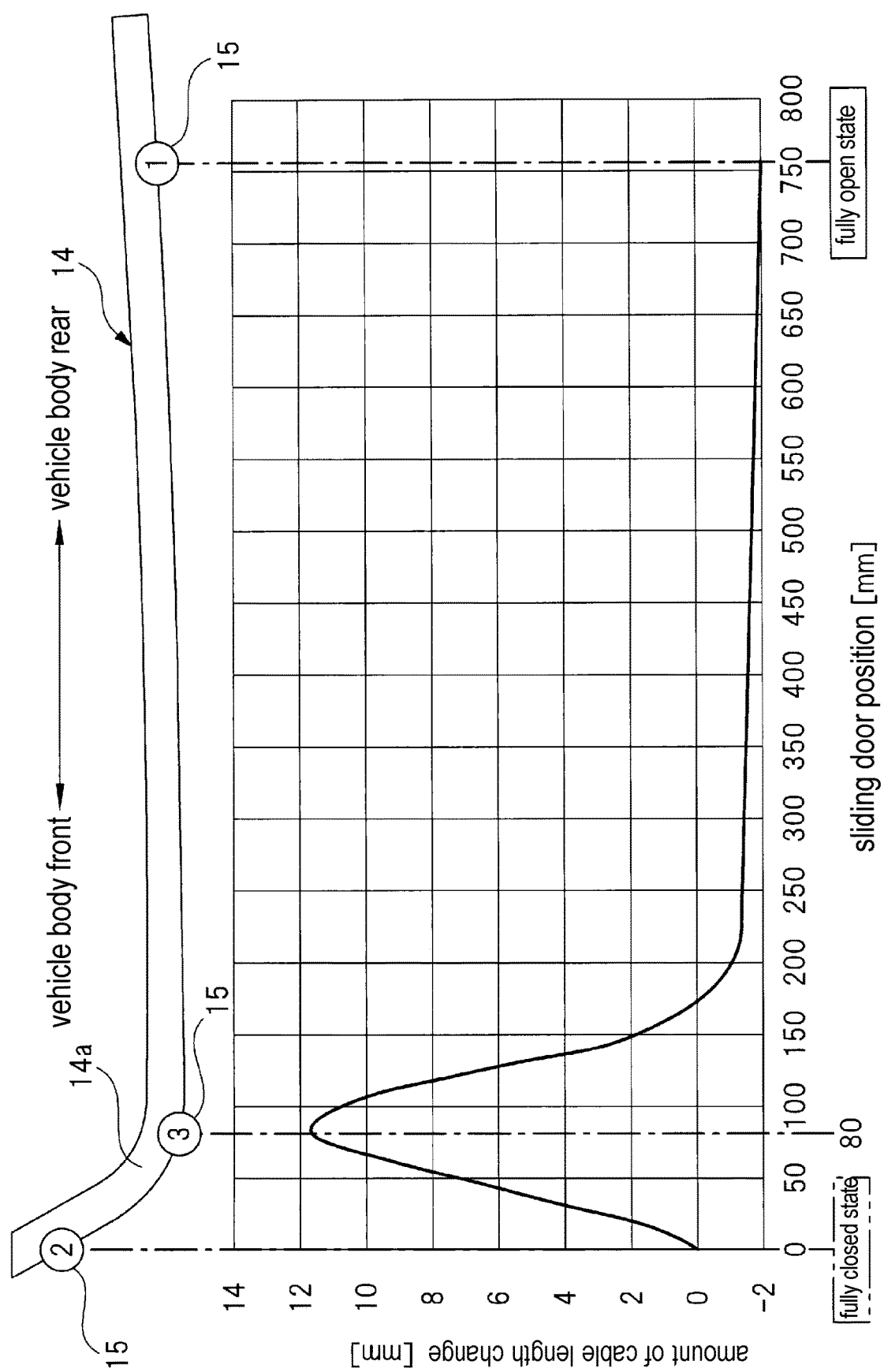
FIG. 11 is a graph for describing a change in cable length.
Figure 12:
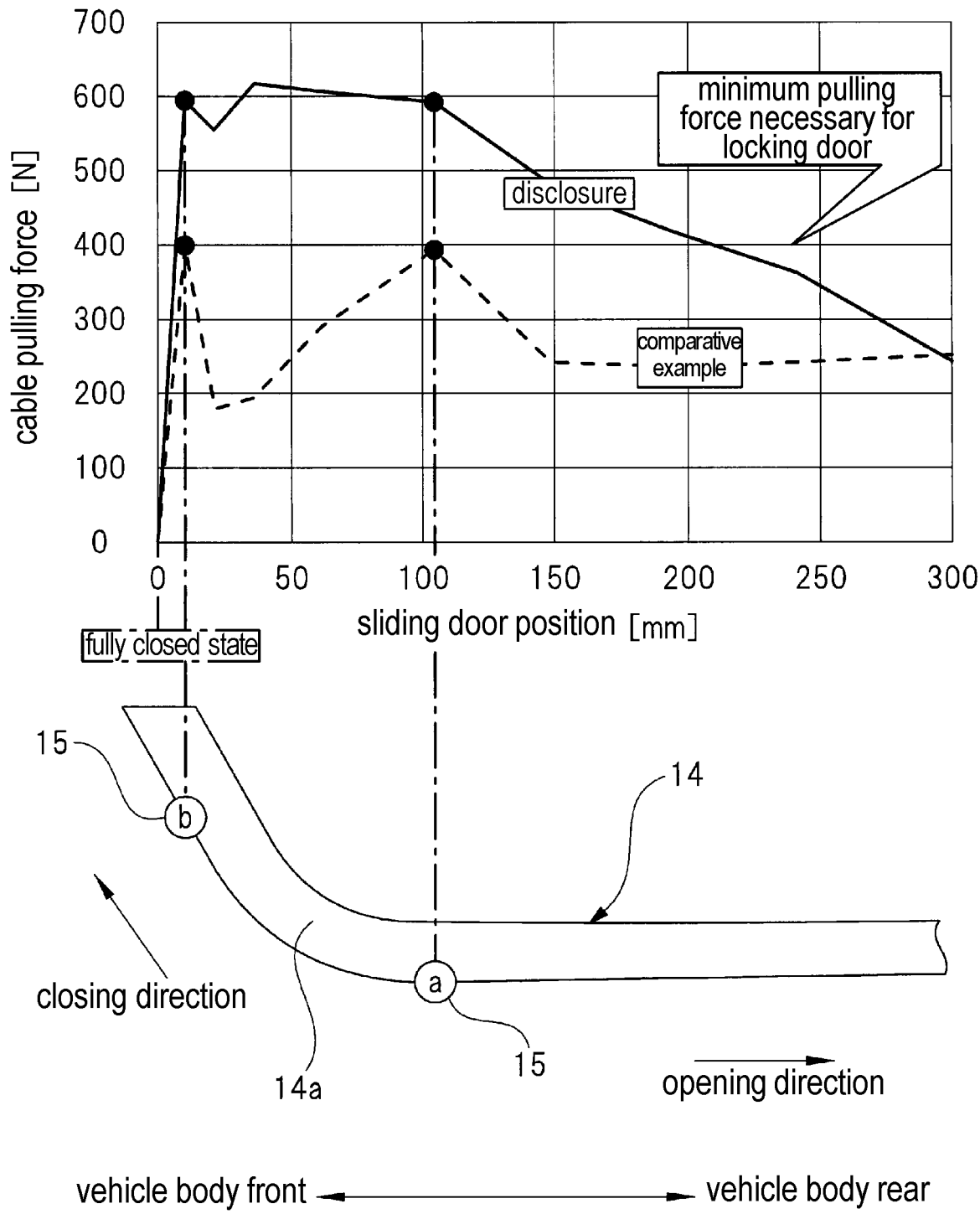
FIG. 12 is a graph for describing a door closer function.

FIG. 9(a) is a view illustrating a [fully open state] where the opening side cable is wound on the opening side drum, FIG. 9(b) is a view illustrating a [fully closed state] where the closing side cable is wound on the closing side drum, FIG. 10 is an explanatory view for explaining a change in a cable length, FIG. 11 is a graph for describing a change in the cable length, and FIG. 12 is a graph for describing a door closer function.

[Operation to Close Sliding Door]

First, an operation of the sliding door 13 performed from the state indicated by the solid line of FIG. 2, that is, the [fully open state] where the sliding door 13 is fully opened until the sliding door is closed will be described.

When an operator turns an operation switch (not illustrated) to a "closing operation," the brushless motor 43 (see FIG. 4) is driven forward. Then, the closing side drum 70 is driven to rotate in the direction of the arrow "close" with a high rotational torque via the reduction mechanism 100 (see FIG. 4) as illustrated in FIG. 9(a). Accordingly, the closing side cable 23 is gradually wound from the large diameter cable groove 74a of the closing side drum 70 to the small diameter cable groove 73a (see FIG. 7). Thus, the roller assembly 15 is pulled to the front side of the vehicle body, and the sliding door 13 moves in the closing direction.

At this time, the opening side cable 24 is gradually sent out in the state where the opening side cable 24 is wound on both the small diameter cable groove 84a and the large diameter cable groove 83a of the opening side drum 80 (see FIG. 8). Specifically, the opening side drum 80 is driven to rotate in the direction of the arrow "closing" via the drive belt 90 according to the rotation of the closing side drum 70. Accordingly, the opening side cable 24 is sent out to the outside of the drum housing 61 (see FIG. 3) since the opening side cable 24 is pulled by the roller assembly 15 and the opening side drum 80 is driven to rotate. At this moment, the opening side cable 24 is sent out from the large diameter cable groove 83a of the opening side drum 80 first and subsequently sent out from the small diameter cable groove 84a.

Here, when the closing side cable 23 is wound on the large diameter cable groove 74a of the closing side drum 70 through the small diameter cable groove 73a, the opening side cable 24 is sent out from the large diameter cable groove 83a of the opening side drum 80 first and subsequently sent out from the small diameter cable groove 84a. Accordingly, a total length (cable length) of the cables 23 and 24 each pulled out of the drum housing 61 is kept substantially constant. Therefore, rattling of the sliding door 13 and the like can be effectively curbed without causing slack in each of the cables 23 and 24.

Since a change in the cable length of the closing side cable 23 and the opening side cable 24 is reduced during the operation of the drive unit 30 as described above, a "tensioner mechanism" that is a relatively large component is omitted in the drive unit 30. Further, although the coil springs SP are provided in each of the closing side cable guide portion 64 and the opening side cable guide portion 65 as illustrated in FIG. 3, the coil springs SP remove trivial slack in the pair of cables 23 and 24 that has been stretched due to change over time and are sufficiently smaller components than the above-described "tensioner mechanism."

Here, the sliding door 13 is designed to be drawn inward the vehicle body 11 just before the full closing (see FIG. 2). Thus, the roller assembly 15 which causes the sliding door 13 to move passes through a curved portion 14a of the guide rail 14 as illustrated in FIG. 10. Since the roller assembly 15 passes through the most radially outward portion of the curved portion 14a at that moment, particularly the closing side cable 23 is pulled to a radially outward side of the curved portion 14a as indicated by the dashed-line arrow L. That is, the closing side cable 23 is further pulled out to the outside of the drum housing 61 in a case where the sliding door 13 (the roller assembly 15) is on a substantially fully closed side (the solid one part in the drawing) than in a case where the sliding door 13 (the roller assembly 15) is on a substantially fully opened side (the dashed line part in the drawing).

Specifically, an amount of change in the cable length when the sliding door 13 is in the [fully open state], that is, when the roller assembly 15 is at the position of "1" of the guide rail 14 (the rear side of the vehicle body), is −2 mm as illustrated in FIG. 11. In addition, a change in the cable length when the sliding door 13 is in the [fully closed state], that is, the roller assembly 15 is at the position of "2" of the guide rail 14 (the front side of the vehicle body), is 0 mm. Thus, the amount of change in the cable length (−2 mm) when the sliding door 13 is in the [fully open state] can be sufficiently absorbed due to the function of the coil springs SP.

Meanwhile, an amount of change in the cable length when the sliding door 13 is on a substantially closed side which is about 80 mm rearward the vehicle body from the [fully closed state], that is, the roller assembly 15 is at the position of "3" of the guide rail 14 (the position of the curved portion 14a) is about 12 mm which is the largest. Since the change in length of the closing side cable 23 is relatively great in that case, it is not possible to absorb the change only with the function of the coil springs SP provided in the closing side cable guide portion 64. Thus, a winding diameter of the small diameter portion 73 of the closing side drum 70 is set to be small like D2 and D3 (see FIG. 7) and the change in the cable length at the position can be absorbed.

More specifically, the winding diameters D2 and D3 of the small diameter portion 73 of the closing side drum 70 are set to be smaller than the winding diameters d3 and d4 (see FIG. 8) of the small diameter portion 84 of the opening side drum 80 (D2<d3 and D3<d4). Meanwhile, the winding diameter D4 of the large diameter portion 74 of the closing side drum 70 is set to have substantially the same size as the winding diameter d1 of the large diameter portion 83 of the opening side drum 80 (D4≈d1).

Accordingly, the relatively great change (about 12 mm) of the cable length made when the roller assembly 15 passes through the curved portion 14a of the guide rail 14 can be absorbed. Thus, without specially providing the above-described "tensioner mechanism," sluggish operations of the drive unit 30 attributable to increased resistance and rattling of the sliding door 13 that may be caused when the sliding door 13 moves to the fully closed side can be effectively prevented.

Then, the sliding door 13 is drawn further inward the vehicle body 11 according to a continuous closing operation of the drive unit 30. Then, finally, a door locker (not illustrated) provided in the sliding door 13 is engaged with a door striker (not illustrated) provided in the vehicle body 11 and locked, and then the sliding door 13 is in the [fully closed state] where the door is completely closed. The drive unit 30 according to the present embodiment has a door closer function of locking the sliding door 13 in a fully closed state in addition to a function of opening and closing the sliding door 13.

Here, when the sliding door 13 moves to a position on the fully closed side as illustrated in FIG. 12, the drive unit 30 generates a relatively great cable pulling force [N]. Further, the dashed line in the graph of FIG. 12 represents characteristics of a drive unit (not illustrated) of a comparative example. In addition, the drive unit of the comparative example employs a drum having the same winding diameter with respect to a cable throughout the drum (a drum having a constant winding diameter with respect to a cable).

When the roller assembly 15 is at the position of "a" at which the roller assembly 15 gets closer to the curved portion 14a after moving on the guide rail 14 as indicated by the solid line (the embodiment of the disclosure) in the graph of FIG. 12, a large cable pulling force of about 600 N is generated in the embodiment of the disclosure. The reason for this is that winding diameters of the small diameter portion 73 of the closing side drum 70 are set to be small like D2 and D3 (see FIG. 7).

Here, resistance to movement is greater when the roller assembly 15 passes through the curved portion 14a than when the roller assembly 15 passes through a straight line portion of the guide rail 14. Since the closing side cable 23 is pulled with a great cable pulling force (about 600 N) in the embodiment of the disclosure, the sliding door 13 can smoothly move just before full closing of the sliding door 13. On the other hand, since the closing side cable 23 is pulled with a smaller cable pulling force of about 400 N in the comparative example than in the embodiment of the disclosure, there may be concern of the sliding door having a trouble of smoothly moving just before full closing thereof.

In addition, a large cable pulling force of about 600 N is also generated when the roller assembly 15 moves on the guide rail 14, passes through the curved portion 14a, and is at the position of "b," that is, when the sliding door 13 is at a position of the locked state (a state where the door locker is engaged with the door striker) in the embodiment of the disclosure. The reason for this is that winding diameters of the small diameter portion 73 of the closing side drum 70 are set to be small like D2 and D3 (see FIG. 7) as described above.

Therefore, the drive unit 30 according to an embodiment of the disclosure has the door closer function that requires a large driving force and further there is no need to provide a separate door closing device in the vehicle body 11. On the other hand, when the sliding door is at the position of the locked state in the comparative example, the cable can be pulled only with a cable pulling force of about 400 N that is smaller than that in the embodiment of the disclosure. Therefore, in the comparative example, there is no room for the pulling force for bringing the sliding door in the locked state, and thus it is not possible to fulfil the door closer function. Further, in order to sufficiently exhibit the door closer function, research for stably outputting a cable pulling force of at least 400 N is needed.

Further, although the drive unit 30 of the embodiment of the disclosure has a large cable pulling force of about 600 N for the closing side cable 23, this is because the brushless motor 43 is disposed coaxially with the closing side drum 70 (see FIG. 4) that needs to be driven with a high torque as described above and a driving torque of the brushless motor 43 is designed to be transmitted to the closing side drum 70 with high efficiency.

[Operation to Open Sliding Door]

When an operator turns the operation switch to an "opening operation," the brushless motor 43 is driven backward. Then, the opening side drum 80 is driven to rotate in the direction indicated by the arrow "open" via the drive belt 90 as illustrated in FIG. 9(b). Accordingly, the opening side cable 24 is gradually wound from the small diameter cable groove 84a of the opening side drum 80 to the large diameter cable groove 83a (see FIG. 8). Thus, the roller assembly 15 (see FIG. 2) is pulled to the rear side of the vehicle body, and the sliding door 13 moves in the opening direction.

At this moment, the closing side cable 23 is gradually sent out from both the small diameter cable groove 73a and the large diameter cable groove 74a of the closing side drum 70 (see FIG. 7). Specifically, the closing side drum 70 is driven to rotate in the direction of the arrow "open," and accordingly, the closing side cable 23 is sent out to the outside of the drum housing 61 since the closing side cable 23 is pulled by the roller assembly 15 and the closing side drum 70 is driven to rotate. At this moment, the closing side cable 23 is sent out from the small diameter cable groove 73a of the closing side drum 70 first and subsequently sent out from the large diameter cable groove 74a.

As described above, in the case where the sliding door 13 is opened, the reverse operations to those described in [Operation to close sliding door] above are performed. Further, a less cable pulling force is required in the case where the sliding door 13 is opened than in the case where the sliding door 13 is closed and locked. Therefore, the sliding door 13 can be sufficiently opened even with the driving torque of the opening side drum 80 via the drive belt 90 without the drive belt 90 stretching or dropping.

As described above, according to the drive unit 30 of the present embodiment, each of the large diameter portions 74 and 83 is provided on one side of the closing side drum 70 and the opening side drum 80 in the axial direction, each of the small diameter portions 73 and 84 which have a gradually decreasing diameter from the large diameter portions 74 and 83 toward the other side of the closing- and opening side drums 70 and 80 in the axial direction is provided on the other side of the closing- and opening side drums 70 and 80 in the axial direction, and each of the partition walls 73b and 84b, which is disposed between the adjacent small diameter cable grooves 73a and 84a in the axial direction of each of the drums 70 and 80 and prevents the closing side cable 23 and the opening side cable 24 from slipping, is provided in the small diameter portions 73 and 84.

Accordingly, even if winding positions of the closing- and opening side cables 23 and 24 on the closing- and opening side drums 70 and 80 are changed and transferred from the large diameter portions 74 and 83 to the small diameter portions 73 and 84, the thick partition walls 73b and 84b provided in the small diameter portions 73 and 84 can reliably prevent the closing- and opening side cables 23 and 24 from slipping out (derailing) from the small diameter cable grooves 73a and 84a.

In addition, since the height dimensions of the partition walls 73b and 84b formed in the radial direction of the closing- and opening side drums 70 and 80 are set to be greater than the diameter dimensions φ of the closing- and opening side cables 23 and 24 in the drive unit 30 of the present embodiment, the depth dimensions of the small diameter cable grooves 73a and 84a can be set to be large. Thus, the closing- and opening side cables 23 and 24 can be reliably prevented from slipping out of the small diameter cable grooves 73a and 84a.

Furthermore, since the groove pitches P2 and p2 of the respective small diameter cable grooves 73a and 84a of the small diameter portions 73 and 84 are set to be greater than the groove pitches P1 and p1 of the respective large diameter cable grooves 74a and 83a of the large diameter portions 74 and 83 (P2>P1 and p2>p1) in the drive unit 30 of the present embodiment, the relatively thick partition walls 73b and 84b having sufficient rigidity can be provided between the respective small diameter cable grooves 73a and 84a adjacent in the axial direction of the respective closing- and opening side drums 70 and 80. Thus, the thick partition walls 73b and 84b can be reliably prevented from being deformed or broken when the closing- and opening side cables 23 and 24 are wound.

In addition, the closing- and opening side drums 70 and 80 are rotatably accommodated in the motor housing 41 and the motor cover 42, and the inclined portions 61d and 62c partially covering the closing- and opening side drums 70 and 80 from the outside in the radial direction are provided in the motor housing 41 and the motor cover 42, and the gap dimensions S1 and S2 between the partition walls 73b and 84b and the inclined portions 61d and 62c are set to be smaller than the diameter dimensions φ of the closing- and opening side cables 23 and 24. Therefore, this configuration can also prevent the closing- and opening side cables 23 and 24 from slipping out of the small diameter cable grooves 73a and 84a.

The disclosure is not limited to the above-described embodiment, and it is a matter of course that it can be variously modified in a scope not departing from the gist thereof. Although the three-phase brushless motor 43 is employed as an electric motor in the above-described embodiment, for example, the disclosure is not limited thereto, and an electric motor with other specifications such as a brushed electric motor may be employed.

In addition, although the drive belt 90 made of natural rubber or the like is provided between the closing side drum 70 and the opening side drum 80 in the above-described embodiment, the disclosure is not limited thereto, and a power transmission member with other specifications such as a metal chain can be provided between the closing side drum 70 and the opening side drum 80.

In addition, materials, shapes, dimensions, numbers, installation locations, and the like of each of constituent members in the above-described embodiment are arbitrary as long as the disclosure can be achieved with them, and are not limited to the embodiment.

What is claimed is:

1. A drive unit driving an opening and closing body that opens and closes an opening portion, the drive unit comprising:
   a cable pulling the opening and closing body;
   a drum having a cable groove on which the cable is wound;
   an electric motor rotating the drum;
   a large diameter portion provided on one side of the drum in an axial direction;
   a small diameter portion provided on another side of the drum in the axial direction having a diameter gradually decreasing from the large diameter portion to the another side of the drum in the axial direction; and
   a slip preventing wall provided in the small diameter portion, disposed between adjacent cable grooves in the axial direction of the drum, and preventing the cable from slipping out of the cable grooves,
   wherein a spacing of adjacent cable grooves of the small diameter portion in the axial direction of the drum is greater than a spacing of adjacent cable grooves of the large diameter portion in the axial direction of the drum.

2. The drive unit according to claim 1,
   wherein a height dimension of the slip preventing wall in a radial direction of the drum is greater than a diameter dimension of the cable.

3. The drive unit according to claim 1,
   wherein the drum is rotatably accommodated in a housing,
   wherein a covering wall partially covering the drum from an outside in the radial direction of the drum is provided inside the housing, and a gap dimension of a gap between the slip preventing wall and the covering wall is smaller than the diameter dimension of the cable.

\* \* \* \* \*